US011959372B2

(12) United States Patent
Gomez Conzatti Y Martinez et al.

(10) Patent No.: US 11,959,372 B2
(45) Date of Patent: Apr. 16, 2024

(54) FRACTURING SLURRY ON DEMAND USING PRODUCED WATER

(71) Applicant: Schlumberger Technology Corporation, Sugar Land, TX (US)

(72) Inventors: Herbe Gomez Conzatti Y Martinez, Sugar Land, TX (US); Karishma Prasad, Sugar Land, TX (US); Chad Kraemer, Houston, TX (US); Salvador Ayala, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/479,595

(22) Filed: Oct. 2, 2023

(65) Prior Publication Data

US 2024/0044234 A1 Feb. 8, 2024

Related U.S. Application Data

(63) Continuation of application No. 17/999,806, filed as application No. PCT/US2021/035396 on Jun. 2, 2021.

(Continued)

(51) Int. Cl.
*E21B 43/00* (2006.01)
*B01F 23/50* (2022.01)
(Continued)

(52) U.S. Cl.
CPC .......... *E21B 43/2607* (2020.05); *B01F 23/56* (2022.01); *B01F 25/31243* (2022.01);
(Continued)

(58) Field of Classification Search
CPC ...... E21B 43/2607; C02F 11/12; B01F 23/56; B01F 25/31243; B01F 2101/49
See application file for complete search history.

(56) References Cited

U.S. PATENT DOCUMENTS 8,360,152 B2 1/2013 DeFosse
8,669,213 B2 3/2014 Gupta
(Continued)

FOREIGN PATENT DOCUMENTS

CN 102858905 A 1/2013
CN 105126669 A 12/2015
(Continued)

OTHER PUBLICATIONS

Substantive Exam issued in Saudi Arabia Patent Application No. 522441506 dated Sep. 14, 2023, 12 pages with English translation.
(Continued)

*Primary Examiner* — Anshu Bhatia
(74) *Attorney, Agent, or Firm* — Jeffrey D. Frantz

(57) ABSTRACT

Systems and methods presented herein generally relate to a method that includes receiving water at a centralized facility. The method also includes receiving sand from one or more sand mines at the centralized facility. The method further includes receiving one or more chemicals at the centralized facility. In addition, the method includes using processing equipment of the centralized facility to process the water, the sand, and the one or more chemicals to produce a fracturing slurry. The method also includes conveying the fracturing slurry from the centralized facility to one or more fracturing sites.

20 Claims, 16 Drawing Sheets

Related U.S. Application Data

(60) Provisional application No. 63/033,619, filed on Jun. 2, 2020.

(51) Int. Cl.
  *B01F 25/312* (2022.01)
  *C02F 11/12* (2019.01)
  *C09K 8/62* (2006.01)
  *E21B 43/26* (2006.01)
  *B01F 101/49* (2022.01)

(52) U.S. Cl.
  CPC ............ *C02F 11/12* (2013.01); *C09K 8/62* (2013.01); *B01F 2101/49* (2022.01)

(56) References Cited

U.S. PATENT DOCUMENTS

| | | | |
|---|---|---|---|
| 8,851,179 | B2 | 10/2014 | DeFosse |
| 2010/0132949 | A1 | 6/2010 | DeFosse et al. |
| 2012/0024525 | A1 | 2/2012 | Svarczkopf |
| 2012/0325751 | A1 | 12/2012 | Renick |
| 2013/0255941 | A1 | 10/2013 | Olson |
| 2014/0129296 | A1 | 5/2014 | Muraviyova |
| 2018/0187508 | A1 | 7/2018 | Roesner |
| 2018/0214829 | A1* | 8/2018 | Oldham .................. B01F 23/59 |
| 2019/0009232 | A1 | 1/2019 | Yeung |
| 2020/0056457 | A1* | 2/2020 | Acharya ................. E21B 21/06 |
| 2020/0129934 | A1 | 4/2020 | Trahan |
| 2020/0129943 | A1 | 4/2020 | Mahiko et al. |

FOREIGN PATENT DOCUMENTS

| | | |
|---|---|---|
| EP | 3124741 A4 | 4/2017 |
| WO | 2014138468 A1 | 9/2014 |
| WO | 2020079149 A1 | 4/2020 |
| WO | 2021247659 A1 | 12/2021 |
| WO | 2021247666 A1 | 12/2021 |

OTHER PUBLICATIONS

Substantive Exam issued in Saudi Arabia Patent Application No. 522441502 dated Sep. 14, 2023, 14 pages with English translation.
Search Report and Written Opinion of International Patent Application No. PCT/US2021/035386 dated Sep. 10, 2021; 12 pages.
International Preliminary Report on Patentability of International Patent Application No. PCT/US2021/035396 dated Dec. 15, 2022, 7 pages.
Search Report and Written Opinion of International Patent Application No. PCT/US2021/035396 dated Sep. 10, 2021; 11 pages.
International Preliminary Report on Patentability of International Patent Application No. PCT/US2021/035386 dated Dec. 15, 2022, 7 pages.
Exam Results issued in Algeria Patent Application No. DZ/P/2022/000956 dated Mar. 22, 2023, 2 pages with English translation.
Exam Results issued in Algeria Patent Application No. DZ/P/2022/000955 dated Mar. 22, 2023, 2 pages with English translation.

* cited by examiner

FRACTURING SLURRY ON DEMAND USING PRODUCED WATER

CROSS-REFERENCE TO RELATED APPLICATION

This application is a continuation of U.S. Nonprovisional application Ser. No. 17/999,806, filed Nov. 23, 2022, which is the National Stage Entry of International Application No. PCT/US2021/035396, filed Jun. 2, 2021, which claims priority to and the benefit of U.S. Provisional Patent Application Ser. No. 63/033,619, entitled "Distribution of Hydraulic Fracturing Fluids," filed Jun. 2, 2020, which is hereby incorporated by reference in its entirety for all purposes.

BACKGROUND

The present disclosure generally relates to using water at a centralized facility to produce fracturing slurry on-demand for delivery to one or more fracturing wells depending on particular needs of the one or more fracturing wells.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Shale oil and shale gas are generally only economically viable in the United States and Canada when hydrocarbon pricing is favorable and the scale of operations allows for fixed costs to be spread across maximum activity as variable costs are simultaneously minimized. In general, wells generally go through three planning phases (e.g., drilling, completion, and production) in the operator's decision-making process. Often, there is limited cooperation and shared knowledge across the domains and decision-making teams within the operator's organization. For example, completions engineers are often not well interfaced with production teams and, therefore, it falls upon managers that are higher up in the organization to impose simple economic rationalizations like the reuse of produced water in hydraulic fracturing upon the field. As such, it has been recognized that systems for improved decision-making with respect to produced water are desirable.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method that includes receiving water at a centralized facility. The method also includes receiving sand from one or more sand mines at the centralized facility. The method further includes receiving one or more chemicals at the centralized facility. In addition, the method includes using processing equipment of the centralized facility to process the water, the sand, and the one or more chemicals to produce a fracturing slurry. The method also includes conveying the fracturing slurry from the centralized facility to one or more fracturing sites.

Certain embodiments of the present disclosure also include a method that includes receiving water at a centralized facility via one or more water pipelines. The method also includes receiving sand from one or more sand mines at the centralized facility via one or more sand pipelines. The method further includes receiving one or more chemicals at the centralized facility. In addition, the method includes using processing equipment of the centralized facility to process the water, the sand, and the one or more chemicals to produce a fracturing slurry. The method also includes conveying the fracturing slurry from the centralized facility to one or more fracturing sites via one or more fracturing slurry pipelines.

Certain embodiments of the present disclosure also include a method that includes receiving produced water from one or more well sites at a centralized facility via one or produced water pipelines. The method also includes receiving sand from one or more sand mines at the centralized facility via one or more sand pipelines. The method further includes receiving one or more chemicals at the centralized facility. In addition, the method includes conveying the produced water, the sand, and the chemicals from the centralized facility to one or more fracturing sites via one or more fracturing slurry pipelines. Movement of the produced water, the sand, and the chemicals through the one or more fracturing slurry pipelines passively mixes the produced water, the sand, and the chemicals into a fracturing slurry without using active mixing equipment.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which.

DETAILED DESCRIPTION

Figure 1:
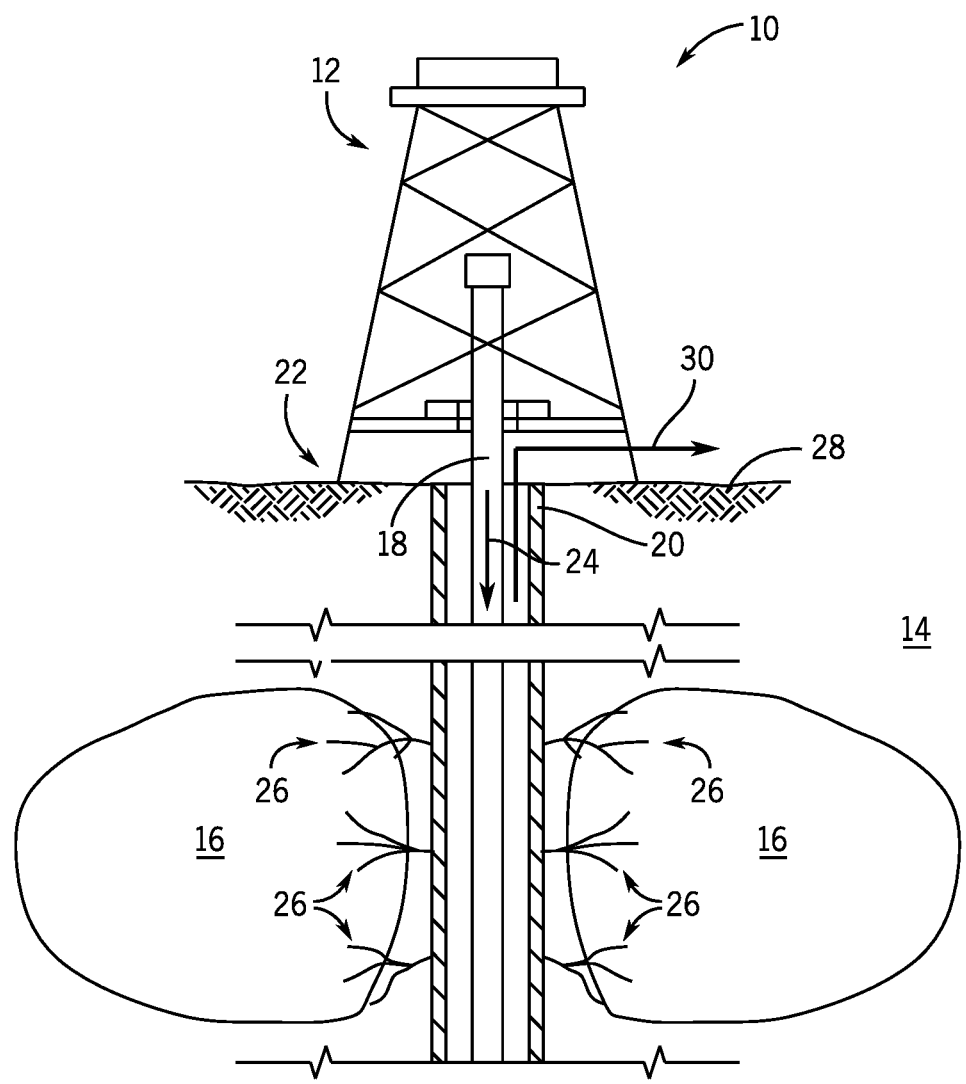
FIG. 1 illustrates a well site having a drilling rig positioned above a subterranean formation that includes one or more oil and/or gas reservoirs.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole", "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

As used herein, a fracture shall be understood as one or more cracks or surfaces of breakage within rock. Fractures can enhance permeability of rocks greatly by connecting pores together and, for that reason, fractures can be induced mechanically in some reservoirs in order to boost hydrocarbon flow. Certain fractures may also be referred to as natural fractures to distinguish them from fractures induced as part of a reservoir stimulation. Fractures can also be grouped into fracture clusters (or "perf clusters") where the fractures of a given fracture cluster (perf cluster) connect to the wellbore through a single perforated zone. As used herein, the term "fracturing" refers to the process and methods of breaking down a geological formation and creating a fracture (i.e., the rock formation around a wellbore) by pumping fluid at relatively high pressures (e.g., pressure above the determined closure pressure of the formation) in order to increase production rates from a hydrocarbon reservoir.

In addition, as used herein, the terms "real time", "real-time", or "substantially real time" may be used interchangeably and are intended to described operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "automatic" and "automated" are intended to describe operations that are performed are caused to be performed, for example, by a process control system (i.e., solely by the process control system, without human intervention).

It is generally the case that oil and gas wells eventually produce water along with hydrocarbons. Both the produced water and the returned injected hydraulic fracturing fluid or "flowback" (e.g., usually 15-50% of the initial volume returns, typically, gradually amalgamating with formation water) are deemed oilfield wastes and are, therefore, subject to regulatory constraints on handling and disposal. FIG. 1 illustrates a well site 10 having a drilling rig 12 positioned above a subterranean formation 14 that includes one or more oil and/or gas reservoirs 16. During operation, a derrick and a hoisting apparatus of the drilling rig 12 may raise and lower a drilling string 18 into and out of a wellbore 20 of a well 22 to drill the wellbore 20 into the subterranean formation 14, as well as to position downhole well tools within the wellbore 20 to facilitate completion and production operations of the well 22. For example, in certain operations, a hydraulic fracturing fluid (e.g., a fracturing slurry) may be introduced into the well 22 through the drilling string 18, as illustrated by arrow 24, which may be used to create fractures 26 in the subterranean formation 14 to facilitate production of oil and/or gas resources from the well 22. As described in greater detail herein, the produced water and the returned injected hydraulic fracturing fluid may be returned to the surface 28 of the well site 10 (e.g., through the annulus between the drilling string 18 and the wellbore 20), as illustrated by arrow 30. In certain circumstances, for every barrel of oil that is produced from a well 22, approximately three barrels of formation water (e.g., relatively high salt content water) are also produced.

Figure 2:
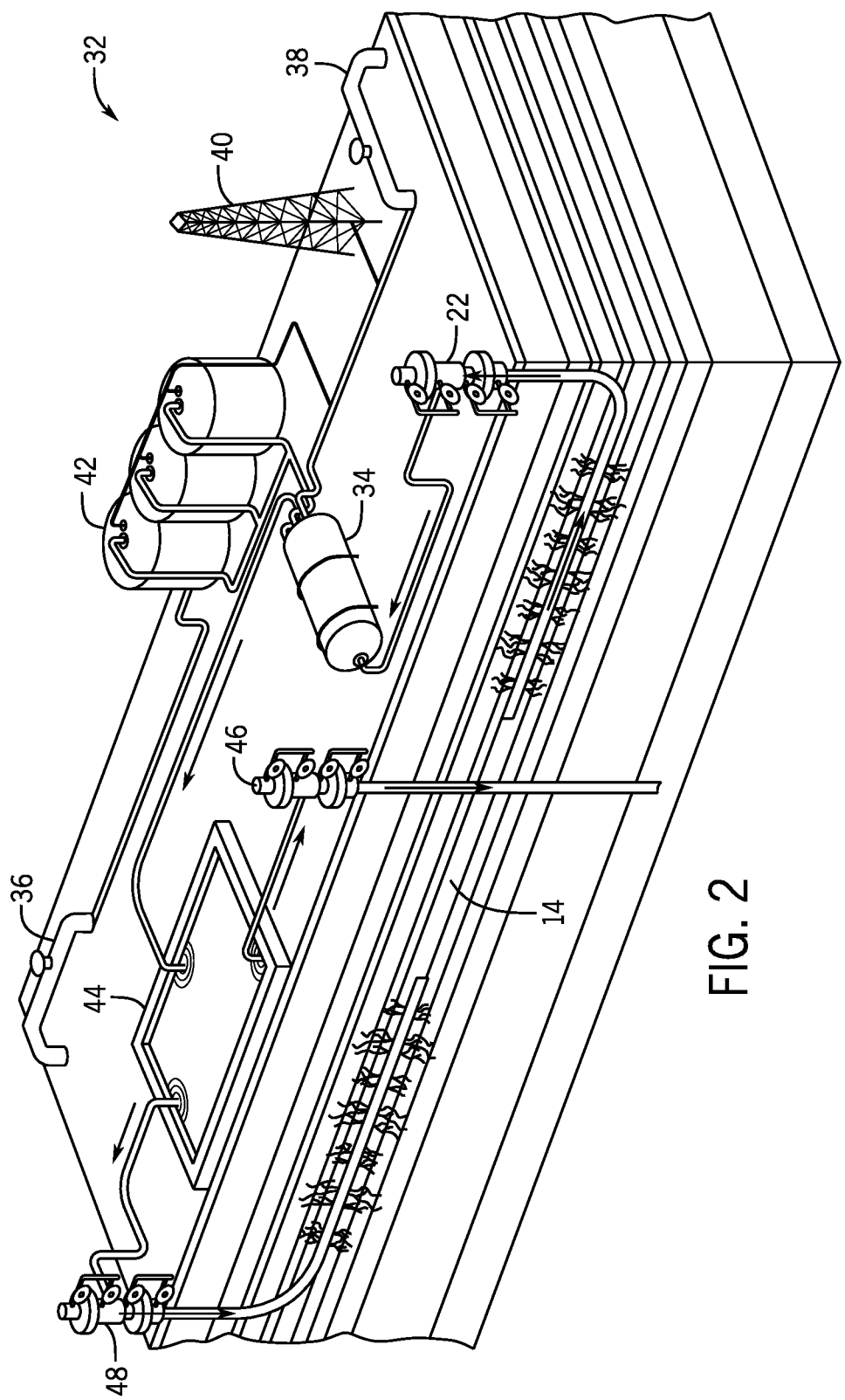
FIG. 2 illustrates an example life cycle for produced water generated at well sites.

Oil and gas producers quite often contract for disposal and handling of the produced water with a midstream specialist firm focused on water handling and disposal (WHD). In many instances, the produced water is treated and injected in saltwater disposal (SWD) wells. FIG. 2 illustrates an example life cycle 32 for produced water generated at well sites 10. As illustrated in FIG. 2, water is produced along with oil and gas at one or more production wells 22. Then, each reservoir fluid (e.g., oil, gas, the produced water, the returned injected hydraulic fracturing fluid, and so forth) may be separated using one or more separators 34 with most of the produced oil and gas being directed into oil and gas pipelines 36, 38, respectively, and the remainder flared via a flare stack 40 and the produced water being directed to a temporary storage facility 42 for local (e.g., at the well site 10) treatment and subsequent storage in, for example, a surface pond 44. In general, most of the produced water is re-injected into SWD wells 46 with only a small portion used for fracturing purposes via injection into a formation 14 by one or more fracturing wells 48.

The life cycle 32 illustrated in FIG. 2 creates quite a few additional costs for oil and gas producers. For example, each well site 10 must include onsite chemical and sand inventory equipment (e.g., storage mechanisms such as tanks, bins, hoppers, and so forth) and blending equipment to, for example, mix the chemicals and the sand together. In addition, the chemicals and the sand need to be brought to the well sites 10 via trucks. With respect to sand transportation, the sand is usually first transported from a mine to a transloading facility, where trucks are loaded and the sand is sent to the well sites 10. Then, those trucks must return to the transloading facility empty, which doubles the mileage that has to be driven in each delivery. In certain regions, approximately 550 truckloads are used for every well 22 per week (e.g., approximately 70 truckloads per day per well 22). Chemical delivery to the well sites 10 functions very similar to sand, except that the chemicals may come from multiple transloading facilities, with each of the transloading facilities using different transportation methods such as tote tanks on flat beds, transport tanks, and/or specialized tanks.

Figure 3:
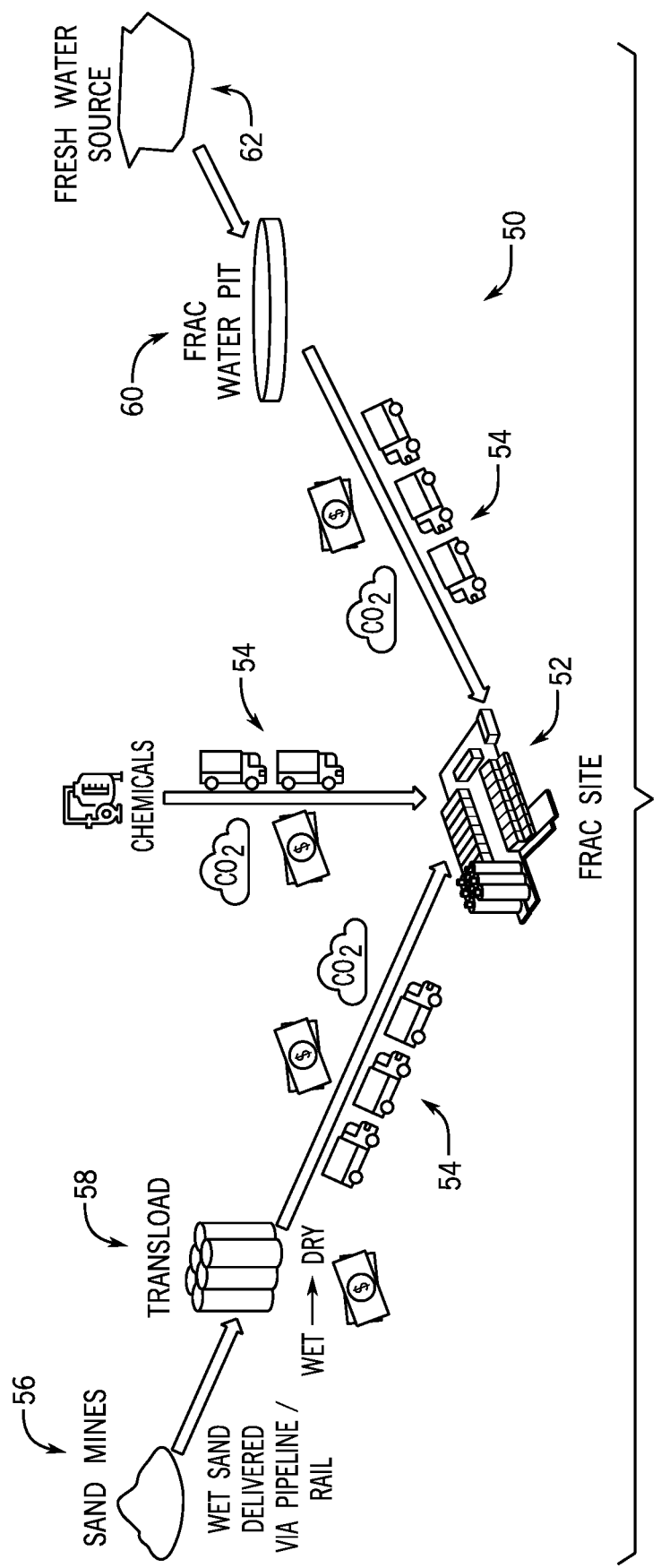
FIG. 3 is a schematic diagram of a system wherein fracturing slurry is mixed onsite at fracturing sites consistent with the life cycle illustrated in FIG. 2.

FIG. 3 is a schematic diagram of a system 50 wherein fracturing slurry is mixed onsite at fracturing sites 52 consistent with the life cycle 32 illustrated in FIG. 2. It will be appreciated that the fracturing sites 52 described herein may be a subset of the well sites 10 described herein, the only difference being that the fracturing sites 52 are well sites that include fracturing wells 48 (and perhaps production wells 22), whereas the well sites 10 include production wells 22 (and perhaps fracturing wells 48).

As illustrated in FIG. 3, fit-for-purpose equipment is used at the fracturing sites 52 to combine water, sand, friction reducers, and other chemicals (e.g., iron control, biocides, clay stabilizers, surfactants, and so forth) in specific ratios to produce a fracturing slurry onsite at the fracturing sites 52. Then, the fracturing slurry is conveyed to relatively high pressure equipment to inject the fracturing slurry downhole. As described in greater detail herein, in such embodiments, the chemicals used onsite at the fracturing sites 52 are typically transported via land using trucks 54 (or flat beds or any other chemical containers). In addition, sand is also transported from sand mines 56 using trucks 54 (e.g., airslides, sand boxes, and so forth) via sand distribution points 58 (e.g., transloading facilities, some of which convert wet sand from the sand mines 56 into dry sand before transportation) to the fracturing sites 52. In addition, water is often transferred from fracturing water pits 60 and/or from fresh water sources 62 via temporary transfer lines to the fracturing sites 52, but trucks 54 are still widely used where such infrastructure or services are not available.

As such, the sand is delivered to the fracturing sites 52 using trucks 54, and the sand is loaded into silos or containers prior to being delivered to specialized units typically known as fracturing blenders using conveyor belts, augers and/or gravity. In addition, the chemicals are also delivered to the fracturing sites 52 using trucks 54, and from there to the fracturing blenders as needed. Finally, the fracturing blenders deliver the fracturing slurry to relatively high pressure pumps that inject the fracturing slurry into a formation. As illustrated in FIG. 3, each of these delivery mechanisms for chemicals, sand, and water to the fracturing sites 52 incur transportation costs as well as generate unwanted pollution. Furthermore, the requirement of fit-for-purpose equipment to produce the fracturing slurry onsite at the fracturing sites 52 incurs even more additional costs.

With a goal of eliminating certain of these additional costs, the embodiments described herein include a new process in which fracturing slurry (e.g., prepared using sand, water, friction reducers, and/or other chemicals) is mixed at a centralized facility and delivered via pipeline or temporary transfer lines (such as transfer hoses, lay-flat hoses, polymeric pipes, metallic pipes, etc.) to fracturing sites 52 as needed. Such centralized production and delivery of fracturing slurry may be referred to as "slurry on demand" and eliminates all of the blending equipment required at the fracturing sites 52, eliminates the associated trucking required to transport sand and chemicals to the fracturing sites 52, eliminates certain onsite storage at the fracturing sites 52, and eliminates logistics associated with acquiring sand and chemicals for delivery to the fracturing sites 52.

Figure 4:
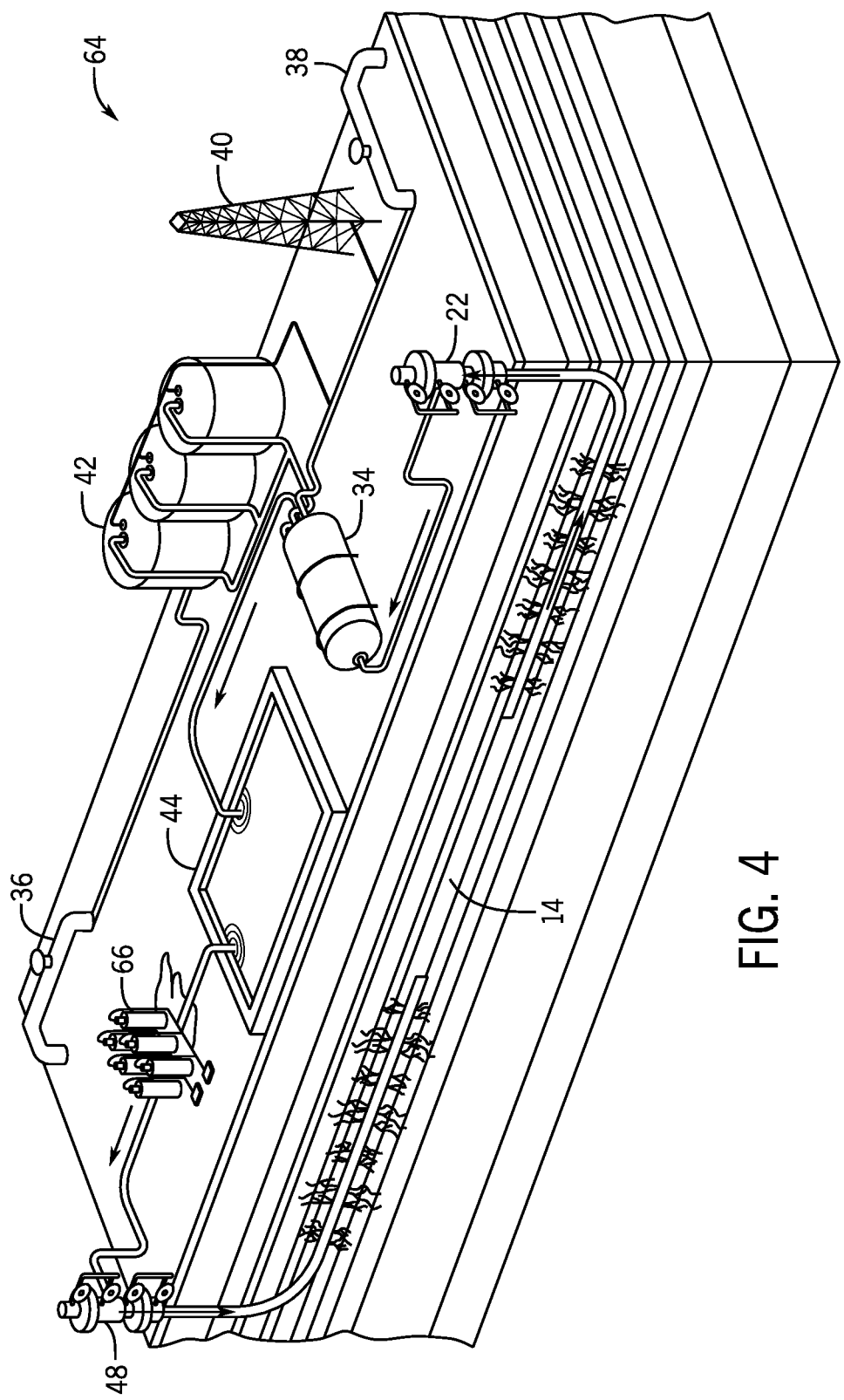
FIG. 4 illustrates a new circular life cycle for produced water generated at well sites, in accordance with embodiments of the present disclosure.

For example, FIG. 4 illustrates a new circular life cycle 64 for produced water generated at well sites 10, as described in greater detail herein. As illustrated in FIG. 4, water is produced along with oil and gas at one or more production wells 22. Then, each reservoir fluid (e.g., oil, gas, the produced water, the returned injected hydraulic fracturing fluid, and so forth) may be separated using one or more separators 34 with most of the produced oil and gas being directed into oil and gas pipelines 36, 38, respectively, and the remainder flared via a flare stack 40 and the produced water being directed to a temporary storage facility 42 for local (e.g., at the well site 10) treatment and subsequent storage in, for example, a surface pond 44. However, in the embodiments described herein, at least some of the produced water may be delivered (e.g., via one or more pipelines) to a centralized facility 66 where the produced water may be reconditioned to meet certain specifications, and be used to mix a hydraulic fracturing fluid/slurry, which may then be delivered (e.g., via one or more pipelines) to one or more fracturing wells 48, where it may be injected into a formation 14 for fracturing purposes.

Although depicted as being in relatively close proximity to the production wells 22 and the fracturing wells 48, as described in greater detail herein, the centralized facility 66 may in fact be at least 0.5 mile away from the well sites 10 and/or the fracturing sites 52, at least 1.0 mile away from the well sites 10 and/or the fracturing sites 52, at least 2.0 miles away from the well sites 10 and/or the fracturing sites 52, at least 5.0 miles away from the well sites 10 and/or the fracturing sites 52, at least 10.0 miles away from the well sites 10 and/or the fracturing sites 52, or even farther away from the well sites 10 and/or the fracturing sites 52. However, again, in certain embodiments, the centralized facility 66 may instead be adjacent to (or in close proximity to, such as within 0.1 mile of) one or more of the well sites 10 and/or the fracturing sites 52.

Figure 5:
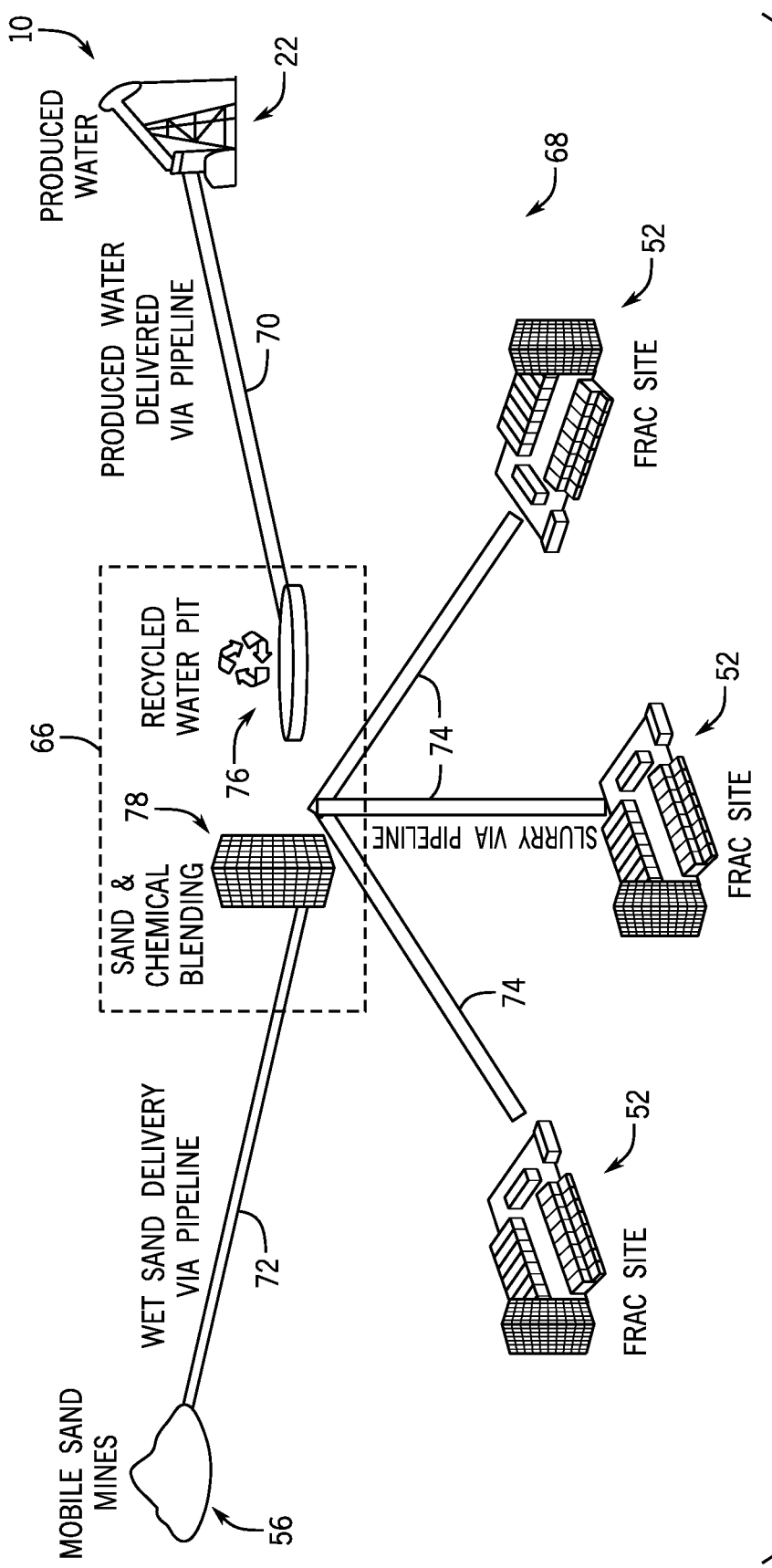
FIG. 5 is a schematic diagram of a system consistent with the new circular life cycle illustrated in FIG. 4, in accordance with embodiments of the present disclosure.

FIG. 5 is a schematic diagram of a system 68 (consistent with the new circular life cycle 64 illustrated in FIG. 4) wherein a centralized facility 66 receives produced water from one or more well sites 10 via one or more produced water pipelines 70, receives wet sand from one or more sand mines 56 via one or more wet sand pipelines 72, and delivers fracturing slurry to one or more fracturing sites 52 (e.g., each having one or more fracturing wells 48) via one or more fracturing slurry pipelines 74. As illustrated in FIG. 5, and described in greater detail herein, the centralized facility 66 may include, among other things, a recycled water pit 76 (or other water storage) to store the produced water received from the one or more well sites 10 and processing equipment (e.g., such as sand and chemical blending equipment) 78 to mix the produced water received from the one or more well sites 10, the sand received from the one or more mobile sand mines 56, and chemicals stored at the centralized facility 66 into the fracturing slurry that is delivered to the one or more fracturing sites 52.

The embodiments described herein replace the use of fresh water in fracturing applications (e.g., at fracturing sites 52) with treated produced water (e.g., from well sites 10). As described in greater detail herein, in certain embodiments, the produced water may first be treated and conditioned for fracturing purposes (e.g., oil content, organic material, calcium, magnesium, Fe2, Fe3, and other minerals are brought within desired values) at the centralized facility 66. Then, the treated and conditioned water may be used to mix a fracturing slurry at the centralized facility 66. Finally, the fracturing slurry may then be distributed via the one or more fracturing slurry pipelines 74 to the one or more fracturing sites 52 where it will be used for fracturing operations. It is noted that the fracturing slurry that arrives at the one or more fracturing sites 52 will be ready to be pumped downhole into a formation 14, with no additional mixing needed at the one or more fracturing sites 52. Accordingly, referring to FIGS. 2 and 3, the producing wells 22, the separators 34, the surface pond 44, the SWD wells 46, and so forth will no longer be required at the fracturing sites 52.

Returning to FIG. 5, in certain embodiments, wet sand (or proppant) will be transported to the centralized facility 66 via one or more wet sand pipelines 72. In certain embodiments, the sand will be mixed at a specific range of concentrations and, if required, diluted at the centralized facility 66 (and/or at the fracturing sites 52) to meet different pump schedule requirements. As such, the embodiments described herein eliminate the need to transport sand using trucks. As described above, it is estimated that approximately 550 trucks per well will be removed from the roads. In addition to less greenhouse gases emissions, there will also be less damage to the roads and safety will be increased due to reduction in traffic. Furthermore, less congestion onsite will lead to a safer work environment for completions operations.

In addition, as described in greater detail herein, other additives such as friction reducers, surfactants, clay stabilizers, and so forth, may be handled and mixed with the fracturing slurry at the centralized facility 66. If needed, the concentration of these additives may be adjusted at the fracturing sites 52 to accommodate concentration changes. As such, the embodiments described herein reduce chemical storage areas at the fracturing sites 52 and allow fracturing operators to focus on relatively high-pressure operations, increasing safety on location and improving service quality at the same time.

As such, the system 68 illustrated in FIG. 5, and described in greater detail herein, changes the conventional logistical chain of sand, chemicals, and water to fracturing sites including novel methods to mine sand, transport sand via pipelines, control the density of the fracturing slurry, and so forth. As described in greater detail herein, the embodiments described herein also enable more efficient equipment utilization, a more consistent and reliable fluid, sand, and chemical blending service, and an improved environmental footprint at the same or lower costs. Furthermore, in addition to enabling sustainable life cycle management for produced water, the embodiments described herein provide other environmental benefits including, but not limited to, approximately 500 ton carbon emissions reduction per well, approximately 550 less trucks on the road per well due to sand sourcing, and up to 5,000 less trucks on the road per well due to streamlined water logistics.

Figure 6:
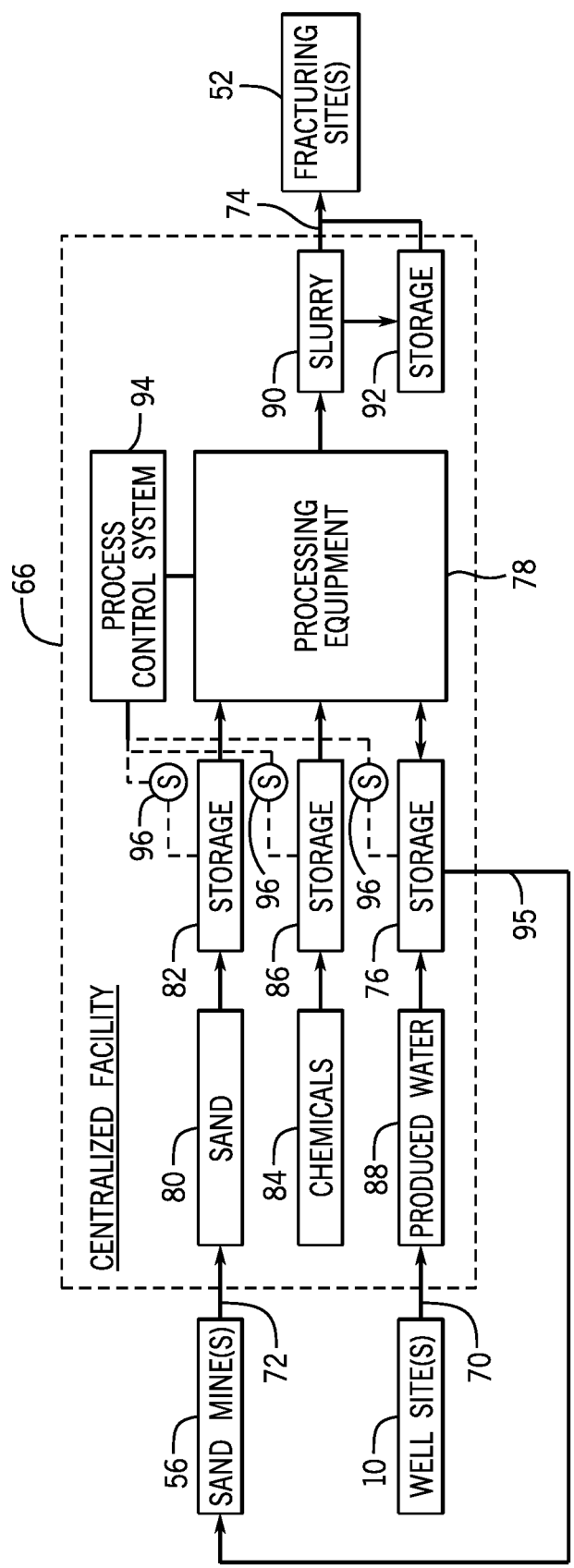
FIG. 6 is a schematic diagram of various operational components of a centralized facility illustrated in FIGS. 4 and 5, in accordance with embodiments of the present disclosure.

FIG. 6 is a schematic diagram of various operational components of the centralized facility 66 illustrated in FIGS. 4 and 5. As illustrated in FIG. 6 and described in greater detail herein, wet sand 80 may be received at the centralized facility 66 from one or more sand mines 56, for example, via one or more wet sand pipelines 72 (however, in other embodiments, the sand may be mined adjacent to, or relatively close to, the centralized facility 66) and stored in sand storage 82 such as hoppers. In addition, chemicals 84 may be received at the centralized facility 66, for example, via trucks that deliver the chemicals 84, as described in greater detail herein, and the chemicals 84 may be stored in chemical storage 86 such as chemical tanks or bins.

Furthermore, produced water 88 may be received at the centralized facility 66 from one or more well sites 10, for example, via one or more produced water pipelines 70 and stored in water storage 76 such as tanks or a recycled water pit. Although described primarily herein as using produced water 88 received from one or more well sites 10, in other embodiments, another water source may be received and used by the centralized facility 66 including, but not limited to, fresh water, water destined for injection via SWD wells 46, water that has been treated for use on a fracturing fleet, water that has been treated to remove certain contaminants, brackish water, water with relatively high total dissolved solids (TDS), and so forth.

As described in greater detail herein, the centralized facility 66 may be at least 0.5 mile away from the sand mines 56, the well sites 10, and/or the fracturing sites 52, at least 1.0 mile away from the sand mines 56, the well sites 10, and/or the fracturing sites 52, at least 2.0 miles away from the sand mines 56, the well sites 10, and/or the fracturing sites 52, at least 5.0 miles away from the sand mines 56, the well sites 10, and/or the fracturing sites 52, at least 10.0 miles away from the sand mines 56, the well sites 10, and/or the fracturing sites 52, or even farther away from the sand mines 56, the well sites 10, and/or the fracturing sites 52. However, again, in certain embodiments, the centralized facility 66 may instead be adjacent to (or in close proximity to, such as within 0.1 mile of) one or more of the sand mines 56, the well sites 10, and/or the fracturing sites 52.

As described in greater detail herein, processing equipment 78 of the centralized facility 66 may process the sand 80, the chemicals 84, and the produced water 88 to produce, among other things, fracturing slurry 90 that may be delivered to one or more fracturing sites 52 from the centralized facility 66, for example, via one or more fracturing slurry pipelines 74. As illustrated, in certain embodiments, a portion of the produced fracturing slurry 90 may be stored in fracturing slurry storage 92 such as slurry tanks. In addition, in certain embodiments, some of the water from the processing equipment 78 may be recirculated back into the water storage 76, as described in greater detail herein.

In addition, in certain embodiments, a process control system 94 may be used to control the processing operations of the centralized facility 66, as described in greater detail herein. For example, in certain embodiments, the process control system 94 may send control signals to various equipment (e.g., valves, pumps, and so forth) of the centralized facility 66 to, for example, automatically control properties (densities, chemical concentrations, flowrates, water compositions, and so forth) of the produced fracturing slurry 90 in substantially real time to desired setpoints based on parameters of the sand 80, the chemicals 84, and the produced water 88, which may be measured by various sensors 96 disposed around the centralized facility 66. In addition, in certain embodiments, the process control system 94 may ensure that the produced water 88 is brought within fracturing water specifications prior to blending the produced water 88 with the sand 80 and the chemicals 84 to produce the fracturing slurry 90.

In addition, in certain embodiments, the produced water 88 stored at the centralized facility 66 may be used at the one or more sand mines 56 to aid in mining operations, as opposed to fresh water, which is typically used in conventional sand mines. For example, in certain embodiments, the produced water 88 may be transported to the one or more sand mines 56 via one or more water supply pipelines 95. In general, the sand 80 may be mined nearby an area to be serviced. From the one or more sand mines 56, the sand 80 may be transported either directly to the one or more fracturing sites 52 or to the centralized facility 66 for processing. In general, the relative geographic locations of the one or more sand mines 56 and the one or more fracturing sites 52 will determine the most efficient destination points.

Figure 7:
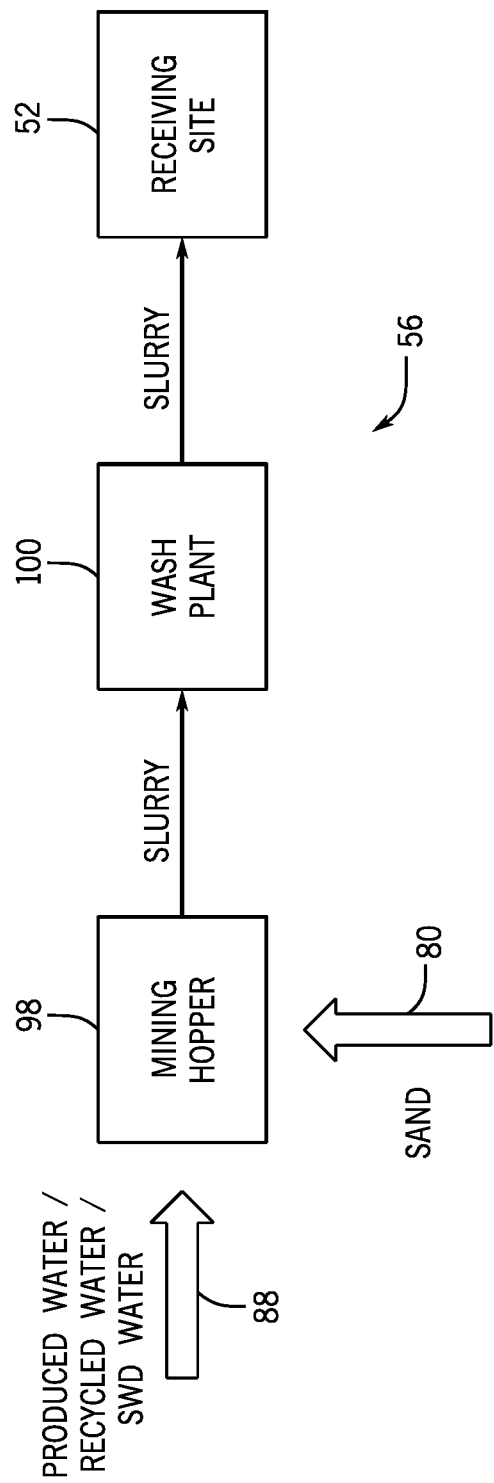
FIG. 7 is a schematic diagram of a sand mine that uses non-traditional water (e.g., produced water or other non-fresh water) in sand mining operations, in accordance with embodiments of the present disclosure.

FIG. 7 is a schematic diagram of a sand mine 56 that uses non-traditional water (e.g., produced water 88 or other non-fresh water) in sand mining operations. As described in greater detail herein, sand mines typically use fresh water to operate the mines in a closed loop system with the main losses being moisture left within the sand during processing. Conventional sand mines typically use fresh water since they normally do not have access to produced water, and because of particular specifications typically received from customers. In contrast, the embodiments described herein supply sand mines 56 (whether mobile or permanent) with a source of water from a non-traditional source (e.g., produced water 88 from well sites 10 or fracturing sites 52, water intended for injection via SWD wells 46, water that is in the process of being recycled, and so forth) and using the source of water in the mining process. The embodiments described herein use the non-traditional water to wash sand 80 (e.g., stored in one or more mining hoppers 98) in a wash plant 100 and then transport the sand 80 using the water 88 to a receiving site (e.g., a fracturing site 52).

There are multiple iterations for the sand mine 56 illustrated in FIG. 7. For example, in certain embodiments, the sand mine 56 may either be closed loop or open loop. In addition, in certain embodiments, the sand mine 56 may be a permanent installation or a mobile installation. Furthermore, in certain embodiments, the wash plant 100 may be located at a separate location from the sand mine 56 or the centralized facility 66, and may be operated in a standalone manner, or may be operated in conjunction with a decanting pile. In addition, in certain embodiments, the mining process performed by the sand mine 56 may include washing the sand 80 using the wash plant 100, transporting the sand 80 within the sand mine 56 as a slurry (e.g., proppant), and/or transporting the sand 80 directly from the sand mine 56.

In addition, although illustrated in FIG. 7 as being produced water 88 (e.g., from well sites 10 or fracturing sites 52), in other embodiments, the water source used by the sand mine 56 may include water destined for injection via SWD wells 46, water that has been treated for use on a fracturing fleet, water that has been treated to remove certain contaminants, brackish water, water with relatively high total dissolved solids (TDS), and so forth. In addition, although illustrated in FIG. 6 as being delivered from the centralized facility 66, in other embodiments, the produced water 88 may instead be received at the sand mine 56 directly from one or more well sites 10 or one or more fracturing sites 52 or may be received from a recycling plant. In addition, although illustrated in FIG. 7 as being delivered to a fracturing site 52, in other embodiments, the slurry (e.g., proppant) produced at the sand mine 56 may instead be delivered to fracturing tanks, a handling facility, fracturing equipment, a decanting pile, or other locations. In addition, in certain embodiments, certain chemicals may be added to the slurry to aid in transportation of the slurry from the sand mine 56.

Returning now to FIG. 6, as described in greater detail herein, the processing equipment 78 of the centralized facility 66 may include various subsystems that enable the operation of the centralized facility 66. For example, in certain embodiments, the various subsystems of the processing equipment 78 may include, but are not limited to, a dilution manifold for diluting the chemicals 84 and the sand 80 in a produced fracturing slurry 90, equipment for dewatering a sand laden stream for density control, a relatively long pipe to passively mix the sand 80, chemicals 84, and produced water 88, and a low-shear addition system for adding friction-reducing additives. As will be appreciated, any and all of these subsystems may be used individually or in combination with any and all combinations of the other subsystems. Each of these subsystems will be described in greater detail below.

Figure 8:
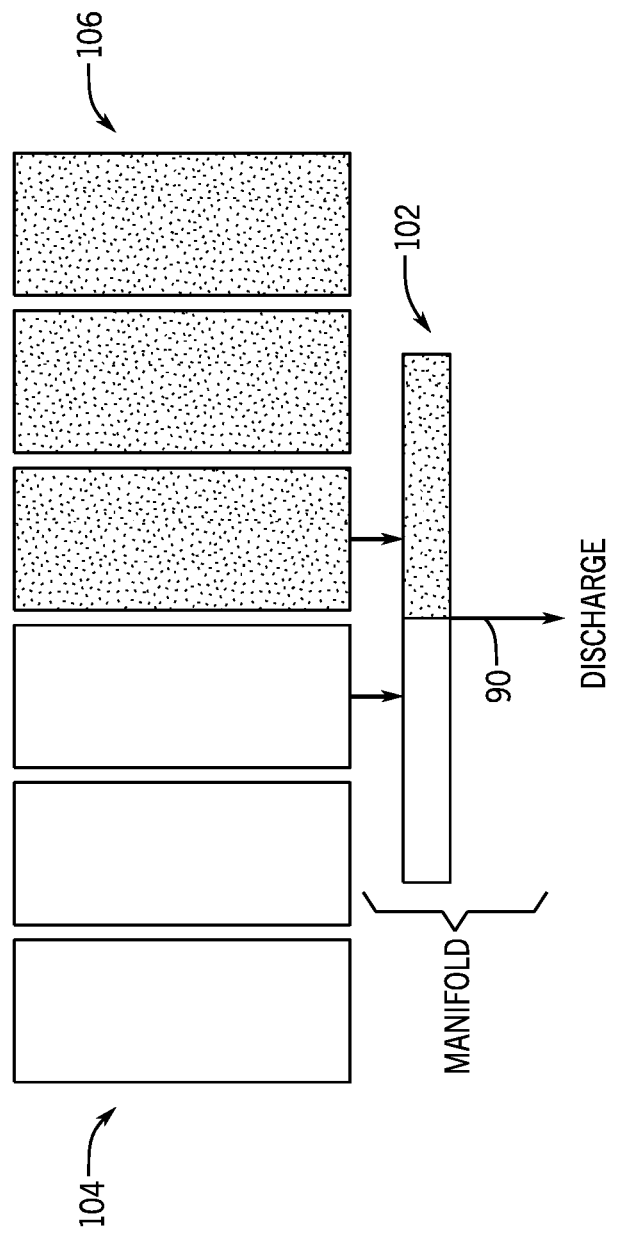
FIG. 8 conceptually illustrates how a dilution manifold of processing equipment of a centralized facility may dilute chemicals and sand in a produced fracturing slurry, in accordance with embodiments of the present disclosure.

For example, FIG. 8 conceptually illustrates how a dilution manifold 102 of the processing equipment 78 of the centralized facility 66 may dilute the chemicals 84 and the sand 80 in a produced fracturing slurry 90. As illustrated in FIG. 8, the dilution manifold 102 is configured to automatically proportion two different fluid streams (e.g., a relatively clean fluid stream 104 having no, or at most trace amounts of, chemicals 84 or sand 80 and a concentrated fluid stream 106 having relatively large amounts of chemicals 84 and/or sand 80) in order to achieve specific concentrations of certain chemicals 84 and/or sand 80 in the fracturing slurry 90 at a discharge of the dilution manifold 102.

Figure 9:
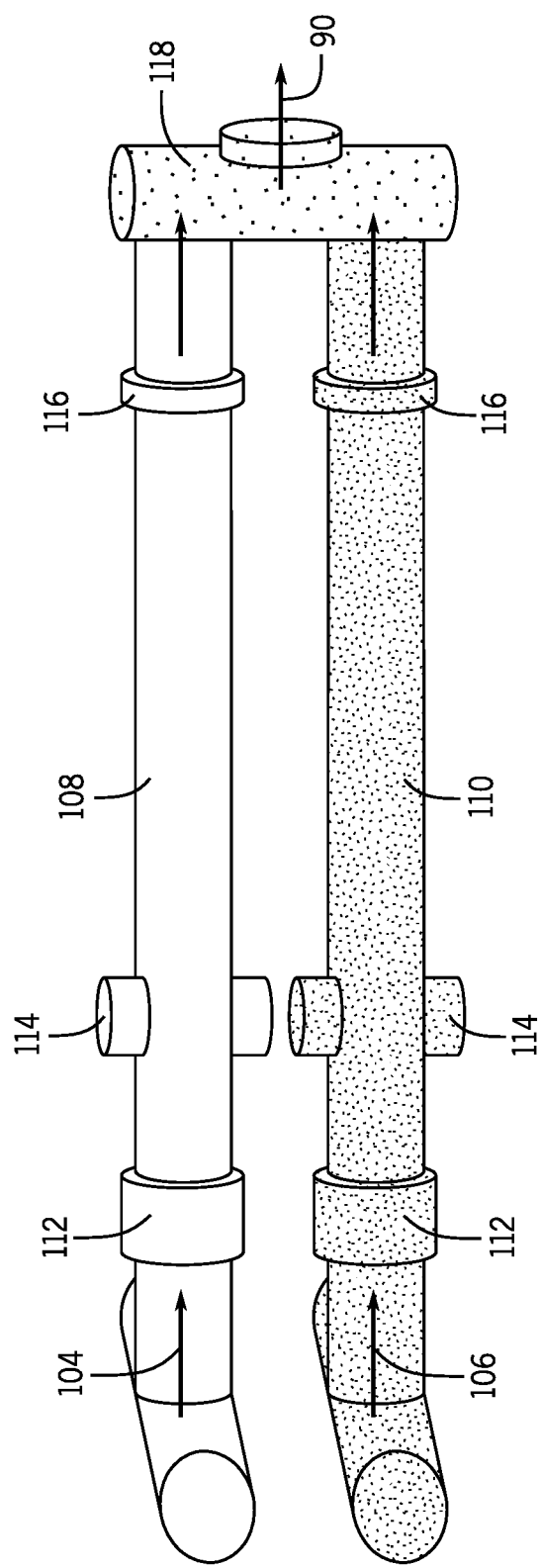
FIG. 9 illustrates an exemplary dilution manifold receiving a relatively clean fluid stream into a first flow conduit and a concentrated fluid stream into a second flow conduit, in accordance with embodiments of the present disclosure.

FIG. 9 illustrates an exemplary dilution manifold 102 receiving a relatively clean fluid stream 104 into a first flow conduit 108 and a concentrated fluid stream 106 into a second flow conduit 110. Again, the relatively clean fluid stream 104 may include no, or at most trace amounts (e.g., less than 5%, less than 3%, less than 1%, or even less) of, chemicals 84 or sand 80, whereas the concentrated fluid stream 106 may include relatively large amounts (e.g., greater than 5%, greater than 10%, greater than 15%, greater than 20%, or even more) of chemicals 84 and/or sand 80.

In certain embodiments, the dilution manifold 102 may include respective flowmeters 112, densitometers 114, and fluid control valves 116 in both flow conduits 108, 110 to automatically adjust suction ratios of the fluid streams 104, 106 in order to discharge a fluid stream (e.g., fracturing slurry 90) having desired concentrations and densities of chemicals 84 and/or sand 80 through a discharge conduit 118 of the dilution manifold 102. In particular, although not illustrated in FIG. 9, in certain embodiments, a process control system 94 (see FIG. 6) may receive signals from the flowmeters 112 and the densitometers 114 relating to flow rates and densities of the respective fluid streams 104, 106, and based at least in part on the received signals, generate and send control signals to the fluid control valves 116 to automatically adjust the blending of the fluid streams 104, 106 in order to maintain desired fluid ratios in order to achieve the desired concentrations and densities of the chemicals 84 and/or sand 80 in the fluid stream (e.g., fracturing slurry 90) discharged from a discharge conduit 118 of the dilution manifold 102. In general, the dilution manifold 102 uses turbulence of the fluid streams 104, 106 within the discharge conduit 118 to homogenize the final mixture without requiring eductors, mixing chambers or tanks, impellers, or other active mixing mechanisms.

Figure 10:
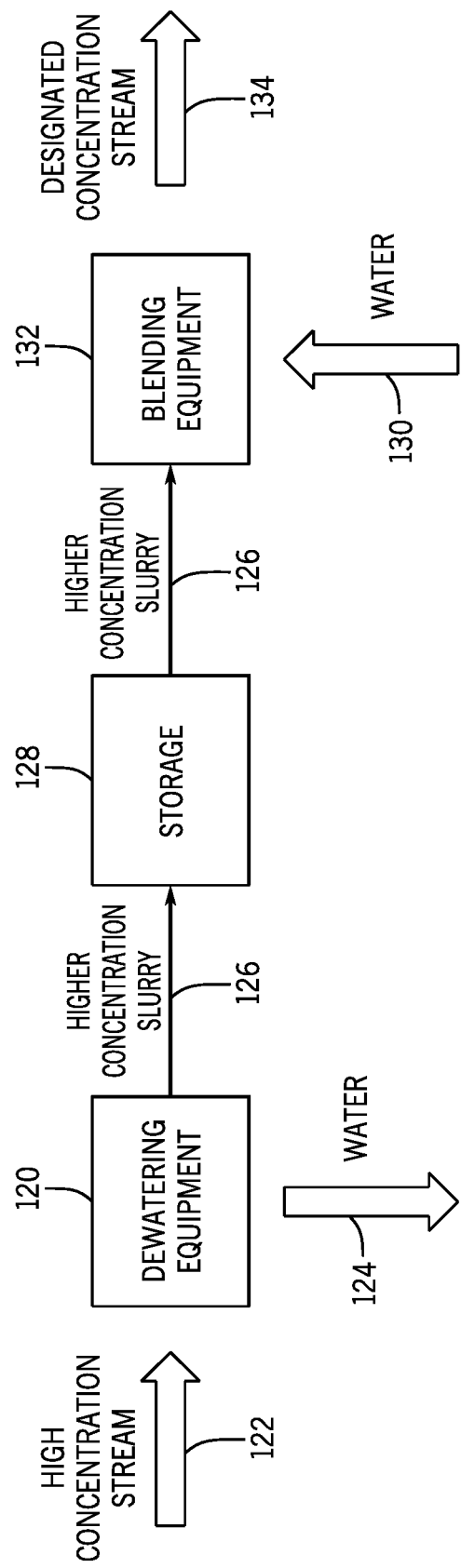
FIG. 10 illustrates dewatering equipment of processing equipment of a centralized facility for dewatering a sand laden stream for density control, in accordance with embodiments of the present disclosure.

In addition, FIG. 10 illustrates dewatering equipment 120 of the processing equipment 78 of the centralized facility 66 for dewatering a sand laden stream for density control. In general, the dewatering equipment 120 receives a first slurry 122 (e.g., fracturing slurry 90) that contains a relatively high concentration of proppant (e.g., sand 80). The first slurry 122 is passed through the dewatering equipment 120 to remove water (e.g., wastewater) 124 from the first slurry 122 to produce a second slurry 126 having an increased concentration of proppant, which may be stored in fracturing slurry storage 128 (e.g., storage 92 illustrated in FIG. 6) in certain embodiments. Although not illustrated in FIG. 10, in certain embodiments, a process control system 94 (see FIG. 6) may control the concentration of proppant in the second slurry 126 to a designated setpoint by, for example, sending control signals to the dewatering equipment 120.

Then, in certain embodiments, the second slurry 126 may be mixed with water (e.g., wastewater) 130 by blending equipment 132 that dilutes the concentration of the second slurry 126 to produce a third slurry 134 having another designated setpoint concentration of proppant, which may be delivered to a receiving location such as a fracturing site 52. As with the other blending equipment described herein, in certain embodiments, the blending equipment 132 illustrated in FIG. 10 may utilize passive blending of the second slurry 126 and the water 130. Again, although not illustrated in FIG. 10, in certain embodiments, a process control system 94 (see FIG. 6) may control the concentration of proppant in the third slurry 134 to another designated setpoint by, for example, sending control signals to various valves to control respective flow rates of the third slurry 134 and the water 130.

Figure 11:
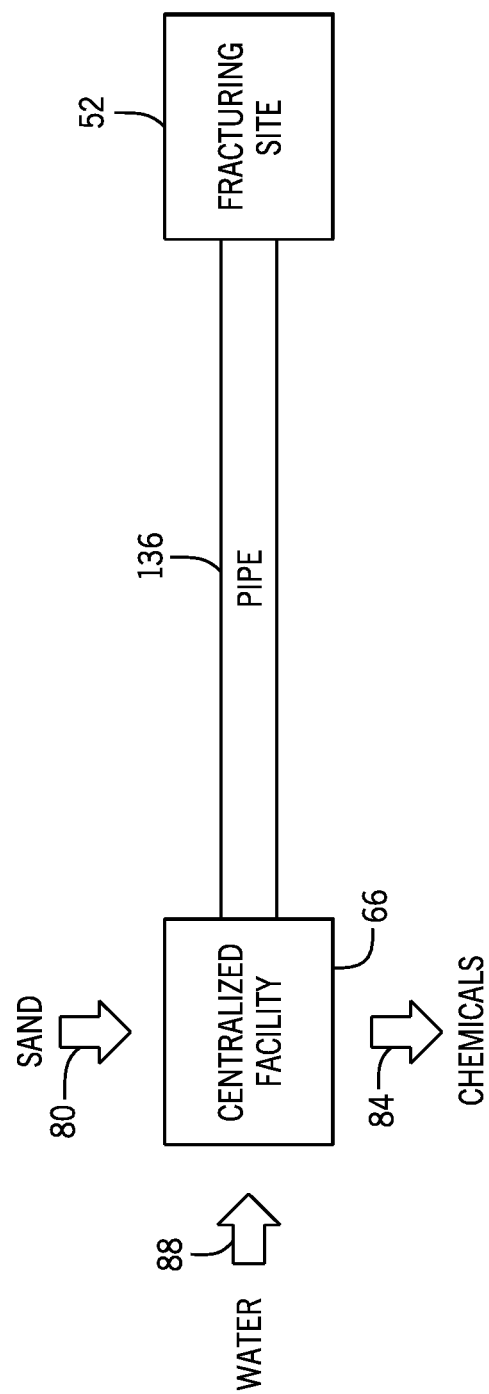
FIG. 11 illustrates a relatively long pipe that may be used to mix sand, chemicals, and/or produced water to produce the fracturing slurry, in accordance with embodiments of the present disclosure.

In addition, as illustrated in FIG. 11, in certain embodiments, a relatively long pipe 136 may be used to mix the sand 80, chemicals 84, and/or produced water 88 to produce the fracturing slurry 90 described herein. As described in greater detail herein, conventional fracturing slurry delivery operations include shearing the fracturing slurry using mechanical means such as centrifugal pumps, vortex mixers, mixing tubs, and so forth. In contrast, the embodiments described herein enable passive mixing through the pipe 136 rather than using active mixing. As such, the pipe 136 achieves a homogenous fracturing slurry 90 to be used in fracturing operations at one or more fracturing sites 52 without using specialized mixing or blending equipment to blend the mixture.

Figure 12:
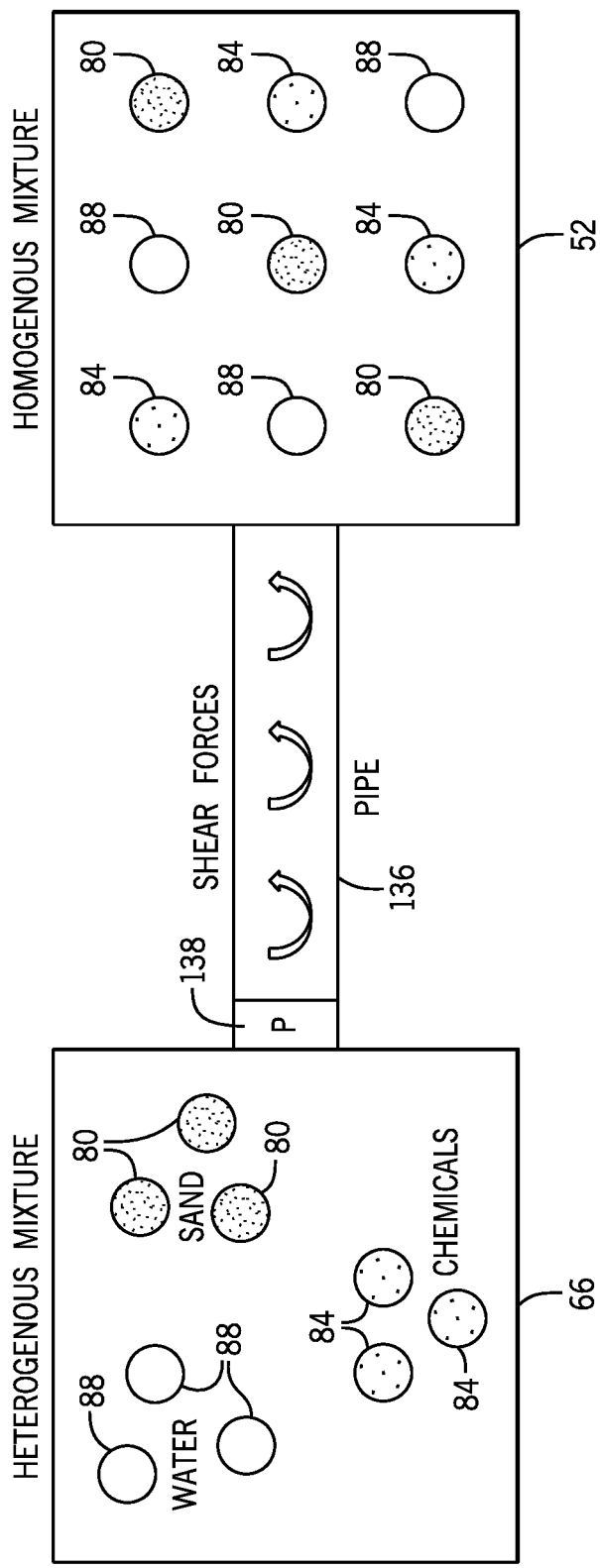
FIG. 12 illustrates a consisting of a collection point (e.g., a centralized facility) where materials (e.g., sand, chemicals, and/or produced water) are added together in desired proportions, but not mixed together using conventional active mixing techniques, in accordance with embodiments of the present disclosure.

As illustrated in FIG. 12, the process consists of a collection point (e.g., the centralized facility 66 described herein) where materials (e.g., sand 80, chemicals 84, and/or produced water 88) are added together in desired proportions, but not mixed together using conventional active mixing techniques. Rather, after collection, a heterogeneous mixture of the materials is energized to be directed through the relatively long pipe 136 using a centrifugal pump 138. In certain embodiments, the pipe 136 may be longer than 0.5 mile, longer than 1.0 mile, longer than 2.0 miles, longer than 5.0 miles, longer than 10.0 miles, or even longer. In certain embodiments, the mixture may be energized multiple times along the relatively long pipe 136 to ensure proper flow rates as it travels through the pipe 136 to one or more destination points (e.g., one or more fracturing sites 52). Relying on shear forces in the relatively long pipe 136 and the relatively long travel time in the pipe 136, the fracturing slurry 90 reaches the one or more destination points as a homogeneous mixture of the materials. In certain embodiments, the mixture of materials flowing through the relatively long pipe 136 may flow at a rate of between approximately 4 feet per second and approximately 16 feet per second, at a rate of between approximately 6 feet per second and approximately 12 feet per second, or at a rate of between approximately 8 feet per second and approximately 10 feet per second.

Although described primarily herein as mixing sand 80, chemicals 84, and produced water 88 to produce the fracturing slurry 90, in other embodiments, different combinations of materials may be mixed using the techniques described herein. For example, in certain embodiments, the fracturing slurry 90 may be comprised of only sand 80 and produced water 88, only chemicals 84 and produced water 88, only chemicals 84 and acids, or any other conceivable combinations. In addition, in certain embodiments, the sand 80 used to produce the fracturing slurry 90 may be dry sand, moist sand, or sand disposed in liquid. In addition, in certain embodiments, the chemicals 84 used to produce the fracturing slurry 90 may be dry chemicals, liquid chemicals, or some combination thereof.

In addition, although described primarily herein as being a centralized facility 66, in other embodiments, the collection point at which the production of the fracturing slurry 90 begins may instead be an open tank or a closed tank. In addition, in certain embodiments, the sand 80 used to produce the fracturing slurry 90 may be received from a mobile sand mine 56 or a permanent sand mine 56. In addition, although described primarily herein as being one or more fracturing sites 52, in other embodiments, the destination point to which the fracturing slurry 90 is delivered may instead be a holding tank, an agitated tank, or equipment that pumps the fracturing slurry 90 downhole.

In addition, in certain embodiments, the relatively long pipe 136 that may be used to provide the passive mixing described herein may include a transfer hose, a lay-flat hose, polymeric pipe, metal pipe (e.g., either temporary or permanent), or pipe made of other materials. In addition, in certain embodiments, the relatively long pipe 136 may have an interior surface that is textured (i.e., not smooth, but rather having protrusions, indentions, and so forth) to facilitate mixing of the materials. In addition, in certain embodiments, the fracturing slurry 90 may be distributed from the collection point (e.g., the centralized facility 66, in certain embodiments) by a centrifugal pump, a positive displacement pump, or any other suitable pump. Furthermore, in certain embodiments, the relatively long pipe 136 may have a plurality of booster pumps disposed along the length of the pipe 136 to ensure that the mixture is reenergized to be able to be pumped the relatively long distance.

In general, the mechanism of proppant transport is essentially velocity, which is maximized as flow rate is maximized. The limitation on flow rate is generally governed by net treating pressure at the surface, which is affected by overburden pressure, perforation friction (e.g., where perforating is the mechanism of contacting the reservoir from the cased well), hydrostatic weight of the fracturing slurry, tubing friction pressure, and so forth. Friction reducers may be used as an enabling technology to reduce the tubing friction pressure term by up to 80% as compared to the base fluid and/or slurry. Using friction reducers can result in higher injection rates at the perforations, which gives more velocity and more sand transport.

Most water-soluble polymers reduce friction; however, it has been found that anionic polyacrylamides are a particularly good choice for fracturing from a cost- and performance-optimization perspective. Anionic polyacrylamides require a certain level of knowledge in order to be selected and used efficiently. However, in general, they are well understood and very efficient both in terms of cost and friction reduction performance per pound of material. In general, it is important to match the polymer chemistry to the water's salinity, and the primary determinant of success is tolerance of divalent cations (e.g., Ca2+, Mg2+, Fe2+, . . . ) because of their tendency to greatly suppress the polymer's radius of gyration in solution due to the way the concentrated cationic charges associate with anionic charges along the polymer backbone, thus decreasing the net negative charge and occasionally crosslinking the polymer to itself. Accordingly, as described in greater detail herein, in certain embodiments, sensors may be used to detect properties of a fluid (e.g., a fracturing slurry 90), and these detected properties may be used to determine which polymers should be used, as well as concentrations of the polymers.

It has also been recognized that higher molecular weight polymers are more efficient, pound for pound, at reducing friction than lower molecular weight polymers. The polymers are highly hygroscopic and are used extensively in water-control projects in oil and gas operations, in pulp-and-paper operations, and in water treatment operations as flocculants/clarifiers, and in solution as dry products in water-absorbing applications such as diapers. Certain blended friction reducer packages feature a hydrocarbon phase or vehicle that suspends either surfactant-stabilized droplets of concentrated polymer (e.g., up to 30% of total mass) or slurried particles of dry polyacrylamide. The purpose of the hydrocarbon phase is to allow the highly hygroscopic polymer to disperse in solution prior to hydration, thus avoiding the formation of relatively viscous regimes in the process train where the polymer concentration is high enough that the local viscosity prevents the dispersion and hydration of further polymer entering the system.

Historically, relatively high shear at the point of addition has been used to allow preparation of uniform mixtures that are performant in fracturing. However, recent improvements in dry friction reducer technology have facilitated the addition of polymers under relatively low-shear conditions without detrimental viscosity at appropriate concentrations for hydraulic fracturing, as described in greater detail herein. This enables cost savings on products due to the absence of the hydrocarbon phase and the surfactants, and also in logistics by allowing transport of dry additives rather than liquids to location. These recent improvements have in turn led to additional cost reduction and simplification by centralizing fluid preparation at a point where, for example, produced water 88 is collected and stored for many operators.

As such, the embodiments described herein also generally include systems and methods that facilitate low-shear (or even no-shear) addition of friction-reducing additives to a fluid (e.g., fracturing slurry 90) at a centralized facility 66, the conveyance of the friction-reduced fluid to a well site 10 (or a fracturing site 52), and the injection of the friction-reduced water into a reservoir 16 to stimulate a production well 22. As used herein, the term "low-shear" is intended to describe relatively low levels of shear or even no shear (e.g., such as passive mixing) as compared to other conventional techniques.

Figure 13:
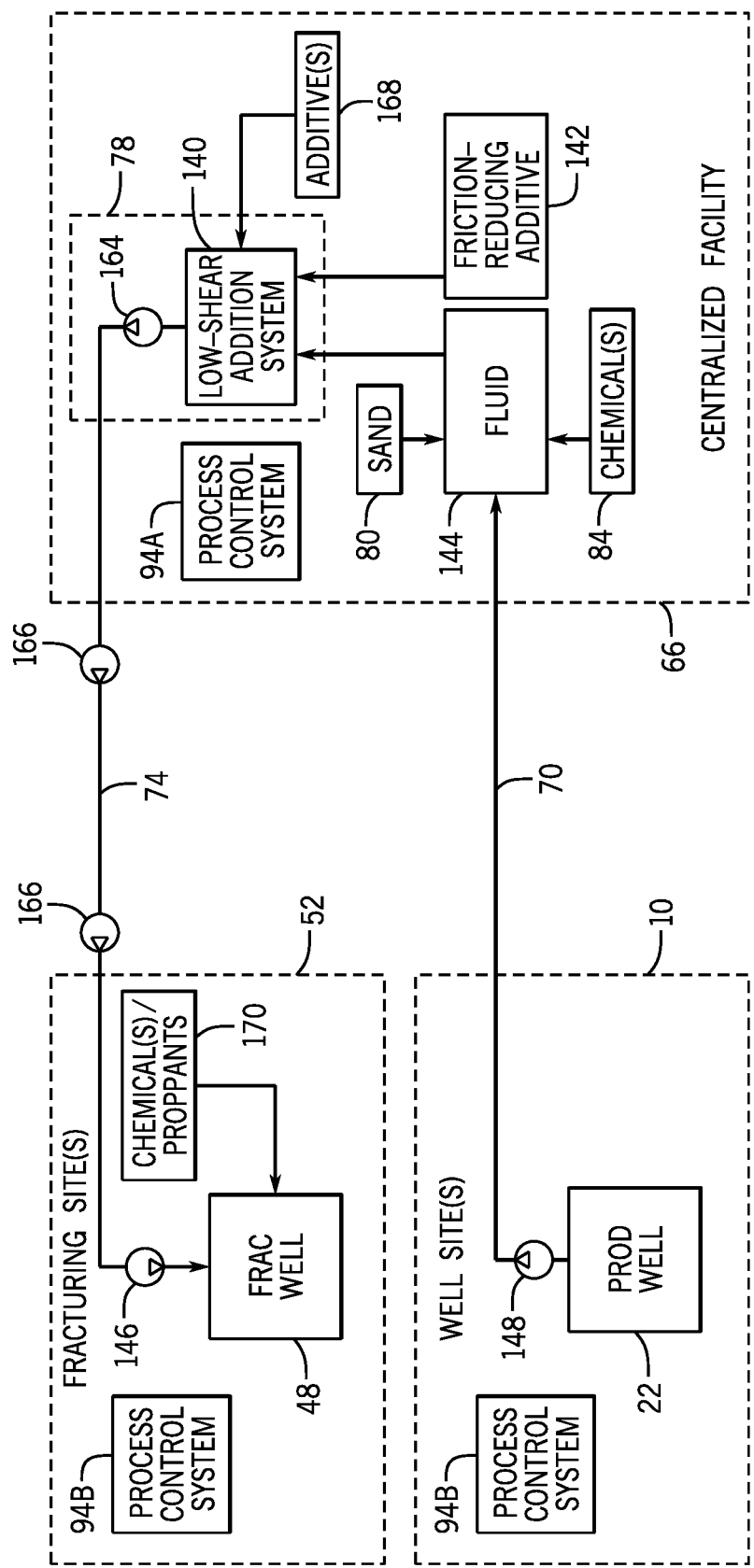
FIG. 13 is a schematic diagram of a centralized facility at which a friction-reducing additive may be added to a fluid to produce a friction-reduced hydraulic fracturing slurry using a low-shear addition system, in accordance with embodiments of the present disclosure.

FIG. 13 illustrates a low-shear addition system 140 of the processing equipment 78 of the centralized facility 66 configured to add a friction-reducing additive 142 to a fluid 144 to produce a fracturing slurry 90, which may be delivered to one or more fracturing sites 52. In certain embodiments, the fluid 144 may be produced water 88, a combination of produced water 88 and sand 80, a combination of produced water 88, sand 80, and chemicals 84, or any other combination of these, as described in greater detail herein. In addition, although described primarily herein as using produced water 88 received from one or more well sites 10, in other embodiments, another water source may be used to produce the fracturing slurry 90 including, but not limited to, fresh water, water destined for injection via SWD wells 46, water that has been treated for use on a fracturing fleet, water that has been treated to remove certain contaminants, brackish water, water with relatively high total dissolved solids (TDS), and so forth. As described in greater detail herein, once the fracturing slurry 90 is produced, it may be conveyed from the centralized facility 66 to one or more fracturing sites 52, for example, via one or more fracturing slurry pipelines 74, and the fracturing slurry 90 may be injected into one or more reservoirs (e.g., using one or more fracturing pumps 146) via one or more fracturing wells 48 at the one or more fracturing sites 52 to stimulate one or more production wells 22.

In certain embodiments, the friction-reducing additive 142 may include at least one of a polyacrylamide, a partially hydrolyzed polyacrylamide, a cross-linked polyacrylamide, a polymethacrylamide, a partially hydrolyzed polymethacrylamide, a cross-linked polymethacrylamide, a polyacrylic acid, a polymethacrylic acid, a polyacrylate, a polymethacrylate, a carboxymethyl cellulose, a polyvinylpyrrolidone, a polysaccharide (e.g., such as xanthan gum, welan gum, and diutan gum), or guar. In addition, in certain embodiments, the friction-reducing additive 142 may include a co-polymer of at least one of a polyacrylamide, a partially hydrolyzed polyacrylamide, a cross-linked polyacrylamide, a polymethacrylamide, a partially hydrolyzed polymethacrylamide, a cross-linked polymethacrylamide, a polyacrylic acid, a polymethacrylic acid, a polyacrylate, a polymethacrylate, a carboxymethyl cellulose, a polyvinylpyrrolidone, or a polysaccharide (e.g., such as xanthan gum, welan gum, and diutan gum).

As illustrated in FIG. 13, in certain embodiments, one or more transfer pumps 148 located at the one or more well sites 10 may be used to pump produced water 88 from one or more production wells 22 through one or more produced water pipelines 70 to the centralized facility 66. As described in greater detail herein, using produced water 88 from one or more production wells 22 to produce fracturing slurry 90 for use in the one or more fracturing wells 48 provides economic and environmental efficiency, among other benefits. However, although illustrated in FIG. 13, and primarily described herein, as utilizing produced water 88 from one or more production wells 22, in other embodiments, water from other water sources (e.g., such as those described herein), for example, located at or near the centralized facility 66 may also be used to produce the fracturing slurry 90 described herein.

As described in greater detail herein, the low-shear addition system 140 facilitates the production of friction-reduced hydraulic fracturing slurry 90 in a relatively low-shear environment as opposed to conventional systems that include relatively high-shear mixers, as well as the use of transport units to transport fluids to well sites. Many different types of low-shear addition systems 140 may be used. For example, eductors consist of tools into which a motive fluid is injected, and a secondary fluid is induced to move (e.g., to agitate liquids, to mix two or more liquids intimately, to bulk transport solids, and so forth), often by the Venturi effect of the motive fluid. In general, velocities align rapidly in eductors such that the intimate contact is relatively low-shear but highly dispersed. Although many variations exist, eductors all generally follow the same principle of operation. Eductors are an effective and low-shear mechanism to airlift and dissolve high volumes of powdered solids in liquids (e.g., mixing polyacrylamide polymers in water, as described in greater detail herein). In contrast, other low-shear blending systems simply sift the solids on the liquid phase; however, this practice is only applicable for solids that easily disperse. However, in certain embodiments, polyacrylamides may be hydrated using this mechanism if slowly added in small quantities.

Figure 14:
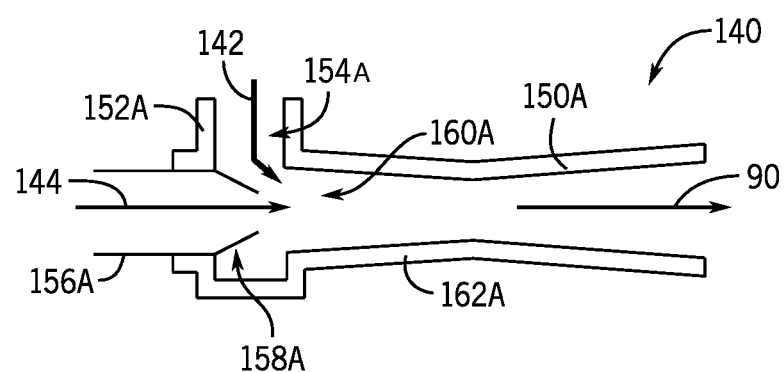
FIG. 14 illustrates an eductor configured to be gravity-fed by a solid metering system or other conveying mechanism, in accordance with embodiments of the present disclosure.
Figure 15:
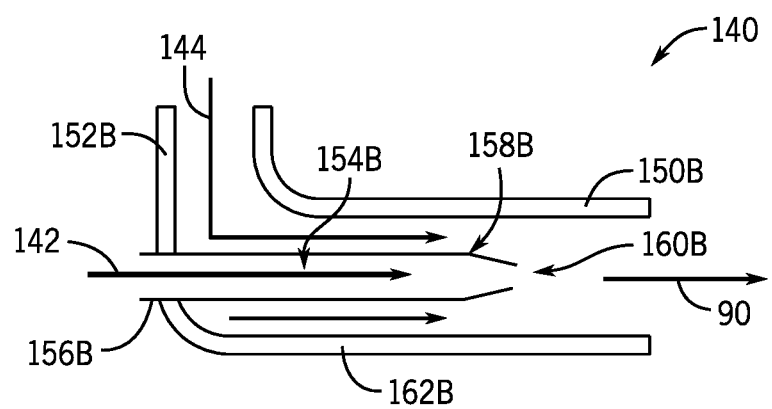
FIG. 15 illustrates an eductor configured to pneumatically convey and disperse air and solids into a motive fluid, in accordance with embodiments of the present disclosure.

In certain embodiments, the low-shear addition system 140 may include one or more eductors configured to add the friction-reducing additive 142 to a fluid 144 to produce friction-reduced hydraulic fracturing slurry 90 in a relatively low-shear environment. FIGS. 14 and 15 illustrate example eductors 150A, 150B that may be used in the low-shear addition system 140 to disperse solids into a liquid phase, as described herein. The eductor 150A illustrated in FIG. 14 is gravity-fed by a solid metering system or other conveying mechanism. As illustrated in FIG. 14, the eductor 150A is configured to receive air and solids (e.g., including the friction-reducing additive 142) via an opening 152A in the top of the eductor 150A. In certain embodiments, the gravity-fed nature of the eductor 150A may be further enhanced by a vacuum 154A produced in the opening 152A of the eductor 150A. As also illustrated in FIG. 14, a motive fluid 144 that has been pumped into the eductor 150A) may be introduced into the eductor 150A via a conduit 156A that includes a nozzle 158A through which the fluid 144 may flow such that the friction-reducing additive 142 is dispersed within the fluid 144 in a relatively low-shear environment 160A within a main chamber 162A of the eductor 150A before exiting the eductor 150A as the friction-reduced hydraulic fracturing slurry 90 and, in certain embodiments, being delivered to one or more well sites 10 and/or one or more fracturing sites 52, for example, via one or more relatively long pipes 136, as described herein.

In contrast, the eductor 150B illustrated in FIG. 15 is configured to pneumatically convey and disperse air and solids (e.g., including the friction-reducing additive 142) into a motive fluid 144. For example, as illustrated in FIG. 15, the fluid 144 may be introduced into the eductor 150B via an opening 152B in the top of the eductor 150B. As also illustrated in FIG. 15, the eductor 150B is configured to receive air and solids (e.g., including the friction-reducing additive 142) via a conduit 156B that includes a nozzle 158B (e.g., a gel gun) through which the air and solids may flow such that the friction-reducing additive 142 is dispersed within the fluid 144 in a relatively low-shear environment 160B within a main chamber 162B of the eductor 150B before exiting the eductor 150B as the friction-reduced hydraulic fracturing slurry 90 and, in certain embodiments, being delivered to one or more well sites 10 and/or one or more fracturing sites 52, for example, via one or more relatively long pipes 136, as described herein. In certain embodiments, the pneumatic nature of the eductor 150B may be further enhanced by a vacuum 154B produced in the conduit 156B of the eductor 150B.

In addition, in other embodiments, the low-shear addition system 140 may employ other types of low-shear (or no-shear) addition mechanisms. For example, in certain embodiments, the low-shear addition system 140 may employ low-shear addition mechanisms where the friction-reducing additive 142 is simply gravity fed, such as a gravity auger fed system, into a conduit or tank that includes the fluid 144.

Regardless of the type of low-shear addition system 140 employed, the embodiments described herein facilitate the preparation of treatment fluid (e.g., the friction-reduced hydraulic fracturing slurry 90) for hydraulic fracturing in relatively large volumes and/or on a continuous basis at a centralized facility 66. The centralized preparation of a friction-reduced hydraulic fracturing slurry 90 as described herein enables operators to save costs by achieving economy of scale on proppants (e.g., sand 80) and chemicals 84, avoiding manual transport of proppants and chemicals 84 to/from one or more well sites 10 and/or one or more fracturing sites 52, sourcing/selecting of chemicals, blending of proppants and/or chemicals, renting/owning pumps and control systems for chemical addition on location, and so forth. Costs are also saved because the friction-reducing additive 142 may be added via a low-shear addition system 140 to form the friction-reduced hydraulic fracturing slurry 90, which is allowed to condition en route to one or more well sites 10 and/or one or more fracturing sites 52 (e.g., via the relatively long pipes 136 described herein, in certain embodiments) at low-shear—the gentle treatment of the friction-reduced hydraulic fracturing slurry 90 means the median molecular weight of the friction-reducing additive 142 within the friction-reduced hydraulic fracturing slurry 90 is maintained to a greater extent than in relatively high-shear mixers, improving polymer efficiency by as much as 15%. Finally, in certain embodiments, costs are saved because the density of produced water 88 is higher than that of fresh water and, therefore, the contribution of the hydrostatic term (e.g., weight of the friction-reduced hydraulic fracturing slurry 90) on net fracturing pressure is greater, thus allowing savings on diesel fuel to power fracturing pumps 146 used to fracture the wells 22 and/or leading to completion of stages in shorter times.

The embodiments described herein offer well site operators the opportunity to purchase pre-formulated performative fracturing slurry 90 from the same agency they are currently turning their produced water 88 over to for treatment/disposal. However, the embodiments described herein provide further specific advantages. For example, in certain embodiments, produced water 88 may be turned over to the centralized facility 66 and held there. Operators of the wells 22 may then contract with the operators of the centralized facility 66 to "book" a volume of ready-to-use friction-reduced hydraulic fracturing slurry 90 based on upcoming completion activity for the wells 22. In response, the centralized facility 66 may prepare the friction-reduced hydraulic fracturing slurry 90 just prior to release of the friction-reduced hydraulic fracturing slurry 90 when needed. This slurry-on-demand leaves the centralized facility 66 and arrives at a well site 10 and/or fracturing site 52 as a performative fluid that, for example, may enter a storage tank or a blender, as described herein, and then be pumped into a fracturing well 48 without necessity of any chemical additions on-site at the well site 10 and/or fracturing site 52, in certain embodiments.

Returning now to FIG. 13, as described in greater detail herein, various other combinations of processing equipment 78 may be employed to ensure that the friction-reduced hydraulic fracturing slurry 90 is customized for the specific needs of the one or more fracturing wells 48 in which the friction-reduced hydraulic fracturing slurry 90 is used. For example, in certain embodiments, various combinations of process trains may be employed to convey the friction-reduced hydraulic fracturing slurry 90 from the centralized facility 66 to the one or more well sites 10 via the one or more fracturing slurry pipelines 74 (e.g., which may include the relatively long pipes 136 described herein, in certain embodiments). For example, as illustrated in FIG. 13, in certain embodiments, one or more transfer pumps 164 located at the centralized facility 66 may be used to pump the friction-reduced hydraulic fracturing slurry 90 from the centralized facility 66 to the one or more well sites 10 and/or one or more fracturing sites 52 via the one or more fracturing slurry pipelines 74. In addition, in certain embodiments, one or more booster pumps 166 located along the one or more fracturing slurry pipelines 74 may be used to periodically boost the pressure of the friction-reduced hydraulic fracturing slurry 90 to allow the pressure of the friction-reduced hydraulic fracturing slurry 90 to remain relatively low, as described in greater detail herein. Similarly, as also illustrated in FIG. 13, in certain embodiments, one or more transfer pumps 148 located at the one or more well sites 10 may be used to pump produced water 88 from the one or more well sites 10 to the centralized facility 66 via one or more produced water pipelines 70.

As described in greater detail herein, the transfer pumps 164 and the booster pumps 166 that urge the fracturing slurry 90 (and other fluids, in certain embodiments) from the centralized facility 66 to the one or more fracturing sites 52 maintain the pressure of the fracturing slurry 90 (and the other fluids) at a relatively low range of approximately 0 pounds per square inch (psi) to approximately 200 psi, in certain embodiments, as compared to the relatively high pressure ranges used in fracturing operations at the fracturing sites 52 of approximately 1,000 psi to approximately 10,000 psi. For example, in certain embodiments, the relatively low pressure that is used may be a maximum of less than 400 psi, less than 350 psi, less than 300 psi, less than 250 psi, less than 200 psi, or even less.

Accordingly, relatively low pressure centrifugal pumps may be used as the transfer pumps 164 and the booster pumps 166, and transfer hoses, temporary lay-flat hoses, high density polyethylene (HDPE) pipes (or other polymeric pipes), semi-permanent or permanent steel pipes, and other relatively low pressure conduits may be used as the one or more fracturing slurry pipelines 74 (e.g., which may include the relatively long pipes 136 described herein). In general, the fracturing slurry pipelines 74 may include any suitable transfer lines robust enough to convey water and solids. Similarly to the fracturing slurry pipelines 74, the wet sand pipelines 72 described herein may also include any suitable transfer lines robust enough to convey water and solids.

In addition, in certain embodiments, additional water (e.g., non-friction-reduced water) may be added to adjust the composition of the friction-reduced hydraulic fracturing slurry 90. For example, in certain embodiments, additional water from other water sources (e.g., such as those described herein) located at or near the centralized facility 66 may be added to the produced water 88 received from the one or more well sites 10 to produce diluted produced water prior to adding the friction-reducing additive 142 to the produced water 88 using the low-shear addition system 140, and the friction-reducing additive 142 may then be added to the diluted produced water to produce the friction-reduced hydraulic fracturing slurry 90 using the low-shear addition system 140. In addition, in certain embodiments, additional water from a water source located at the one or more fracturing sites 52 may be added to the friction-reduced hydraulic fracturing slurry 90 prior to injecting the friction-reduced hydraulic fracturing slurry 90 into the one or more fracturing wells 48. In addition, in certain embodiments, additional water from a water source located at an intermediate location along the one or more fracturing slurry pipelines 74 between the centralized facility 66 and the one or more fracturing sites 52 may be added to the friction-reduced hydraulic fracturing slurry 90 prior to delivering the friction-reduced hydraulic fracturing slurry 90 to the one or more fracturing sites 52. It will be appreciated that any combination of these water addition techniques may be employed in certain embodiments to adjust the composition of the friction-reduced hydraulic fracturing slurry 90. In addition, as described in greater detail herein, in certain embodiments, additional water, other additives, and other fluids, may be delivered from the centralized facility 66 to the one or more fracturing sites 52 concurrently, and may be mixed together at the one or more fracturing sites 52 prior to injecting the friction-reduced hydraulic fracturing slurry 90 into the one or more fracturing wells 48.

In addition, in certain embodiments, one or more other additives 168 may be added to the friction-reduced hydraulic fracturing slurry 90 at the centralized facility 66 prior to conveying the friction-reduced hydraulic fracturing slurry 90 to the one or more fracturing sites 52. In certain embodiments, the one or more additives 168 may include at least one or a biocide, a flowback surfactant, an acid, a clay stabilizer, a tracer, a scale inhibitor, an oxygen scavenger, a hydrogen sulfide scavenger, a reducing agent, a chelant, an iron control agent, an anti-emulsion agent, a demulsifier, a breaker, a corrosion inhibitor, a pipeline cleaning agent, or a gel pig.

In addition, in certain embodiments, the friction-reduced hydraulic fracturing slurry 90 may be stored in storage facilities such as tanks, lined pits, and so forth. For example, as illustrated in FIG. 6, in certain embodiments, the friction-reduced hydraulic fracturing slurry 90 may be stored in storage (see, e.g., storage 92 in FIG. 6) located at the centralized facility 66 prior to conveying the friction-reduced hydraulic fracturing slurry 90 to the one or more fracturing sites 52. In addition, in certain embodiments, the friction-reduced hydraulic fracturing slurry 90 may be stored in storage located at the one or more fracturing sites 52 after receiving the friction-reduced hydraulic fracturing slurry 90 from the centralized facility 66 and prior to injecting the friction-reduced hydraulic fracturing slurry 90 into one or more fracturing wells 48. Furthermore, in certain embodiments, the friction-reduced hydraulic fracturing slurry 90 may be stored at an intermediate location along the one or more fracturing slurry pipelines 74 (e.g., which may include the relatively long pipes 136 described herein, in certain embodiments) between the centralized facility 66 and the one or more fracturing sites 52. It will be appreciated that any combination of these storage options may be employed in certain embodiments.

In addition, in certain embodiments, one or more additional chemicals and/or proppants 170 may be added to the friction-reduced hydraulic fracturing slurry 90 prior to injecting the friction-reduced hydraulic fracturing slurry 90 into one or more fracturing wells 48. For example, in certain embodiments, the one or more chemicals and/or proppants 170 may be added to the friction-reduced hydraulic fracturing slurry 90 using one or more blenders located at the one or more fracturing sites 52 prior to injecting the friction-reduced hydraulic fracturing slurry 90 into one or more fracturing wells 48. However, in other embodiments, the one or more chemicals and/or proppants 170 may be added to the friction-reduced hydraulic fracturing slurry 90 using one or more blenders located at a site external to the one or more fracturing sites 52 (e.g., including the centralized facility 66) prior to injecting the friction-reduced hydraulic fracturing slurry 90 into one or more fracturing wells 48. It will be appreciated that the one or more chemicals and/or proppants 170 may include any of the other chemicals and/or proppants described herein.

In addition, in certain embodiments, one or more process control systems 94 may be used to control any and all operational parameters of the centralized facility 66 and/or the one or more well sites 10 and/or the one or more fracturing sites 52 to facilitate the production and delivery of friction-reduced hydraulic fracturing slurry 90 to one or more fracturing wells 48 of the one or more fracturing sites 52, as described in greater detail herein. Indeed, in certain embodiments, the one or more process control systems 94 may be used to automatically (e.g., without human intervention) adjust any and all operational parameters of the centralized facility 66 and/or the one or more well sites 10 and/or the one or more fracturing sites 52 to facilitate the production and delivery of friction-reduced hydraulic fracturing slurry 90 to one or more fracturing wells 48 of the one or more fracturing sites 52, as described in greater detail herein.

For example, as illustrated in FIG. 13, a process control system 94A may be used to control operational parameters of the processing equipment 78 located at the centralized facility 66 based at least in part on real-time measurements collected by one or more sensors (see, e.g., the sensors 96 illustrated in FIG. 6) disposed about the centralized facility 66. In certain embodiments, the operational parameters of the processing equipment located at the centralized facility 66 that may be controlled by the process control system 94A may include, but are not limited to, a blending ratio between the sand 80, the chemicals 84, and the produced water 88 by manipulating flow pumps and/or valves of the centralized facility 66, flow rates and/or compositions of the friction-reducing additive 142 and/or the fluid 144 into the low-shear addition system 140 by manipulating flow pumps and/or valves of the centralized facility 66, a blending ratio between the friction-reducing additive 142 and the fluid 144 into the low-shear addition system 140 by manipulating flow pumps and/or valves of the centralized facility 66, flow rates and/or compositions of the one or more additives 168 into the friction-reduced hydraulic fracturing slurry 90 by manipulating valves of the centralized facility 66, flow rates of the friction-reduced hydraulic fracturing slurry 90 to the one or more fracturing sites 52 by manipulating transfer pumps 164, and so forth.

In certain embodiments, the real-time measurements that may be collected by the one or more sensors (see, e.g., the sensors 96 illustrated in FIG. 6) disposed about the centralized facility 66 may include, but are not limited to, water quality (e.g., pH, electrical conductivity, and so forth) of the water sources at the centralized facility 66 (e.g., of the produced water 88 received from the one or more well sites 10, of other water sources, and so forth), specific gravity of the sand 80, the chemicals 84, the produced water 88, and/or the friction-reduced hydraulic fracturing slurry 90 produced by the centralized facility 66, turbidity of the sand 80, the chemicals 84, the produced water 88, and/or the friction-reduced hydraulic fracturing slurry 90 produced by the centralized facility 66, compositions of the sand 80, the chemicals 84, the produced water 88, and/or the friction-reduced hydraulic fracturing slurry 90 produced by the centralized facility 66, friction reduction of the friction-reduced hydraulic fracturing slurry 90 produced by the centralized facility 66 as compared to the water (e.g., the produced water 88 received from one or more well sites 10 and/or additional water from a water source at the centralized facility 66), and so forth.

In addition, as also illustrated in FIG. 13, one or more process control systems 94B may be used to control operational parameters of processing equipment located at the one or more fracturing sites 52 and/or the one or more well sites 10 based at least in part on real-time measurements collected by one or more sensors disposed about the one or more fracturing sites 52 and/or the one or more well sites 10. As will be appreciated, in embodiments where the well sites 10 are also fracturing sites 52, only one process control system 94B may be used.

In certain embodiments, the operational parameters of the processing equipment located at the one or more fracturing sites 52 and/or the one or more well sites 10 that may be controlled by the process control system 94B may include, but are not limited to, flow rates of the friction-reduced hydraulic fracturing slurry 90 delivered to the one or more fracturing sites 52 by manipulating flow pumps and/or valves of the one or more fracturing sites 52, flow rates and/or compositions of the one or more additional chemicals/proppants 170 into one or more blenders by manipulating valves to control the blending of the one or more proppants 170 and the friction-reduced hydraulic fracturing slurry 90 performed by the one or more blenders, flow rates of additional water into the friction-reduced hydraulic fracturing slurry 90 by manipulating valves of the one or more fracturing sites 52, flow rates of the friction-reduced hydraulic fracturing slurry 90 injected into the one or more fracturing wells 48 by manipulating one or more fracturing pumps 146 and/or valves of the one or more fracturing sites 52, flow rates of produced water 88 from the one or more well sites 10 to the centralized facility 66 by manipulating transfer pumps 148 of the one or more well sites 10, and so forth.

In certain embodiments, the real-time measurements that may be collected by the one or more sensors disposed about the one or more fracturing sites 52 and/or the one or more well sites 10 may include, but are not limited to, formation treating pressure and other operational parameters of one or more wells 22 at the one or more well sites 10, water quality (e.g., pH, electrical conductivity, and so forth) at the one or more well sites 10 (e.g., of the produced water 88), specific gravity of the friction-reduced hydraulic fracturing slurry 90, turbidity of the friction-reduced hydraulic fracturing slurry 90, compositions of the friction-reduced hydraulic fracturing slurry 90, and so forth.

In addition, in certain embodiments, the process control systems 94A, 94B may cooperate with each other such that operational parameters of the processing equipment located at the one or more fracturing sites 52 and/or the one or more well sites 10 may be collectively controlled by the process control systems 94A, 94B based at least in part on real-time measurements collected by one or more sensors (see, e.g., the sensors 96 illustrated in FIG. 6) disposed about the centralized facility 66 and/or operational parameters of the processing equipment 78 located at the centralized facility 66 may be collectively controlled by the process control systems 94A, 94B based at least in part on real-time measurements collected by one or more sensors disposed about the one or more fracturing sites 52 and/or the one or more well sites 10. In addition, it will be appreciated that other operational parameters of the processing equipment 78 located at the centralized facility 66 and/or the one or more fracturing sites 52 and/or the one or more well sites 10 may be controlled by the process control system 94A and/or the process control system 94B based at least in part on other real-time measurements collected by one or more sensors (see, e.g., the sensors 96 illustrated in FIG. 6) disposed about the centralized facility 66 and/or the one or more fracturing sites 52 and/or the one or more well sites 10. Indeed, any and all operational parameters of the processing equipment located at the centralized facility 66 and/or the one or more fracturing sites 52 and/or the one or more well sites 10 may be controlled by the process control system 94A and/or the process control system 94B based at least in part on any and all real-time measurements collected by one or more sensors (see, e.g., the sensors 96 illustrated in FIG. 6) disposed about the centralized facility 66 and/or the one or more fracturing sites 52 and/or the one or more well sites 10.

Figure 16:
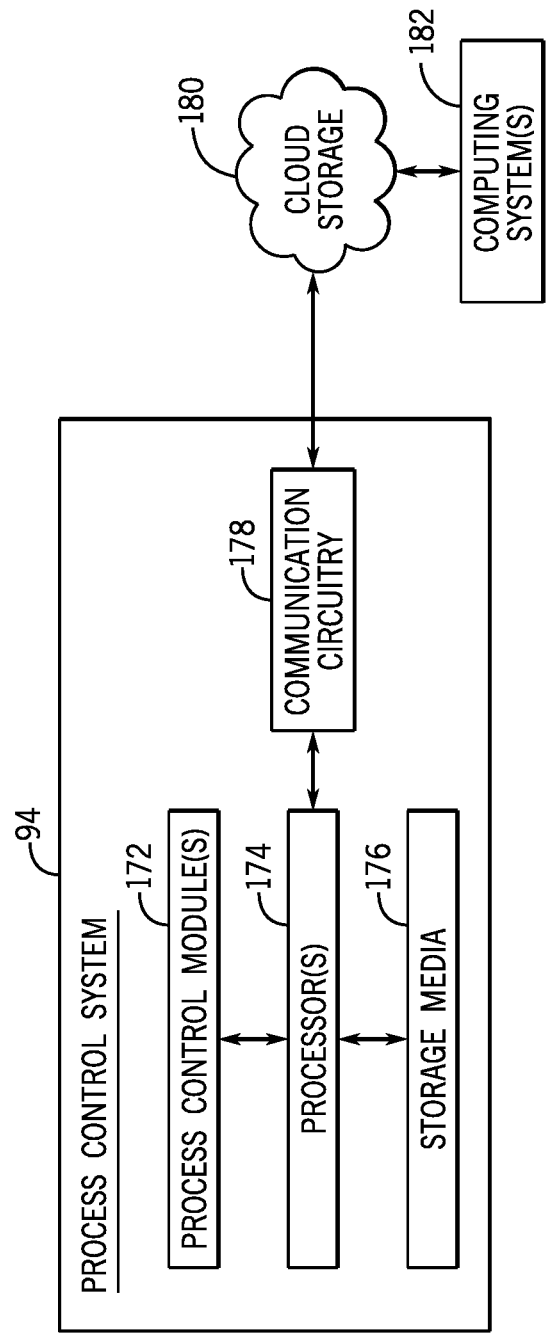
FIG. 16 is a schematic diagram of a process control system, in accordance with embodiments of the present disclosure.

As illustrated in FIG. 16, in certain embodiments, the process control systems 94 described herein may each (or, alternatively, collectively) include one or more process control modules 172 (e.g., a program of computer-executable instructions and associated data) that may be configured to perform various functions of the embodiments described herein. In certain embodiments, to perform these various functions, a process control module 172 executes on one or more processors 174 of the process control system(s) 94, which may be connected to one or more storage media 176 of the process control system(s) 94. Indeed, in certain embodiments, the one or more process control modules 172 may be stored in the one or more storage media 176.

In certain embodiments, the one or more processors 174 may include a microprocessor, a microcontroller, a processor module or subsystem, a programmable integrated circuit, a programmable gate array, a digital signal processor (DSP), or another control or computing device. In certain embodiments, the one or more storage media 176 may be implemented as one or more non-transitory computer-readable or machine-readable storage media. In certain embodiments, the one or more storage media 176 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the process control module(s) 172 may be provided on one computer-readable or machine-readable storage medium of the storage media 176, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 176 may be located either in the machine running the machine-readable instructions, or may be located at a remote site from which machine-readable instructions may be downloaded over a network for execution.

In certain embodiments, the processor(s) 174 may be connected to communication circuitry 178 of the process control system(s) 94 to allow the process control system(s) 94 to communicate with the various sensors, the various processing equipment of the centralized facility 66 and/or the one or more fracturing sites 52 and/or the one or more well sites 10 (as well as other systems described herein), and so forth, for the purpose of controlling operation of the systems described in greater detail herein. In certain embodiments, the communication circuitry 178 may also facilitate the process control system(s) 94 to communicate data to cloud storage 180 (or other wired and/or wireless communication network) to, for example, archive the data or to enable external computing systems 182 to access the data and/or to remotely interact with the process control system(s) 94.

In certain embodiments, the communication circuitry 178 may be, include, or be implemented by various types of standard interfaces, such as an Ethernet interface, a universal serial bus (USB), a third generation input/output (3GIO) interface, a wireless interface, a cellular interface, and/or a satellite interface, among others. In certain embodiments, the communication circuitry 178 may also include a communication device, such as a modem or network interface card to facilitate exchange of data with external computing devices via a network (e.g., Ethernet connection, digital subscriber line (DSL), telephone line, coaxial cable, cellular telephone system, satellite, etc.).

In certain embodiments, friction-reduced hydraulic fracturing slurry, additional water, one or more additives 168, and other fluids may be conveyed from the centralized facility 66 to the one or more fracturing sites 52 concurrently via the one or more fracturing slurry pipelines 74. For example, in certain embodiments, the one or more fracturing slurry pipelines 74 may include multiple pipelines 74 disposed in parallel with each other, each of the pipelines 74 conveying a different fluid.

Figure 17:
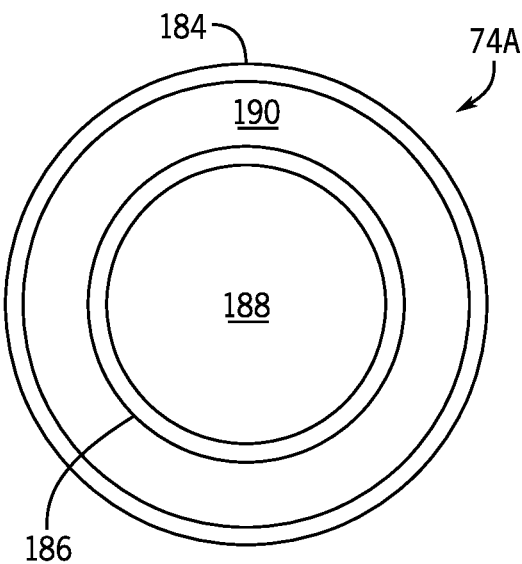
FIG. 17 is a cross-sectional view of a pipeline that includes an external pipe and an internal pipe disposed concentrically within the external pipe for conveying friction-reduced hydraulic fracturing slurry, in accordance with embodiments of the present disclosure.

As illustrated in FIG. 17, in certain embodiments, a single pipeline 74A may include an external pipe 184 with an internal pipe 186 disposed concentrically within the external pipe 184. As such, an interior of the internal pipe 186 forms an internal volume 188 and the annular space between the external pipe 184 and the internal pipe 186 forms an external volume 190. In such an embodiment, a first fluid may be conveyed from the centralized facility 66 to the one or more fracturing sites 52 through the internal volume 188 of the pipeline 74A concurrently with a second fluid conveyed from the centralized facility 66 to the one or more fracturing sites 52 through the external volume 190 of the pipeline 74A. For example, in certain embodiments, the friction-reduced hydraulic fracturing slurry 90 may be conveyed from the centralized facility 66 to the one or more fracturing sites 52 through the internal volume 188 of the pipeline 74A concurrently with additional water (e.g., non-friction-reduced water) conveyed from the centralized facility 66 to the one or more fracturing sites 52 through the external volume 190 of the pipeline 74A. In other embodiments, additional water (e.g., non-friction-reduced water) may be conveyed from the centralized facility 66 to the one or more fracturing sites 52 through the internal volume 188 of the pipeline 74A concurrently with the friction-reduced hydraulic fracturing slurry 90 conveyed from the centralized facility 66 to the one or more fracturing sites 52 through the external volume 190 of the pipeline 74A. Indeed, any and all combinations of friction-reduced hydraulic fracturing slurry 90, additional water, one or more additives 168, and other fluids may be conveyed from the centralized facility 66 to the one or more fracturing sites 52 through the various volumes 188, 190 of the pipeline 74A illustrated in FIG. 17.

Figure 18:
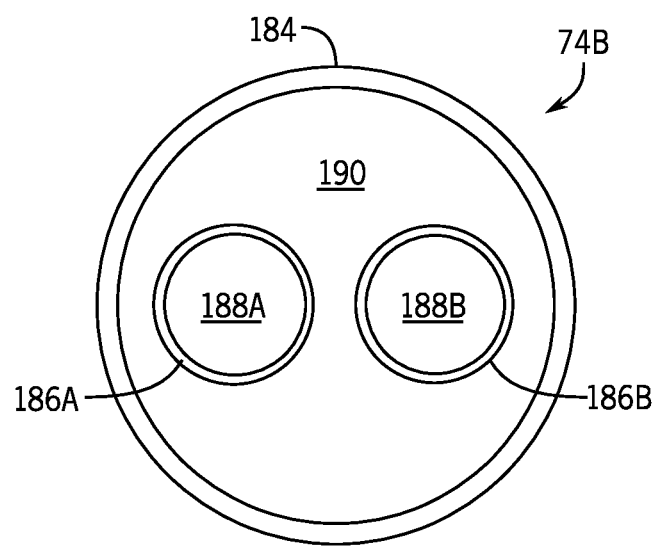
FIG. 18 is a cross-sectional view of a pipeline that includes an external pipe and a plurality of internal pipes disposed within the external pipe for conveying friction-reduced hydraulic fracturing slurry, in accordance with embodiments of the present disclosure.

As illustrated in FIG. 18, in other embodiments, a single pipeline 74B may include an external pipe 184 and a plurality of internal pipes 186A, 186B disposed within the external pipe 184. As such, interiors of each of the internal pipes 186A, 186B form respective internal volumes 188A, 188B and the annular space between the external pipe 184 and the internal pipes 186A, 186B forms an external volume 190. In such an embodiment, a first fluid may be conveyed from the centralized facility 66 to the one or more fracturing sites 52 through a first internal volume 188A of the pipeline 74B concurrently with a second fluid conveyed from the centralized facility 66 to the one or more fracturing sites 52 through a second internal volume 188B of the pipeline 74B concurrently with a third fluid conveyed from the centralized facility 66 to the one or more fracturing sites 52 through the external volume 190 of the pipeline 74B. In particular, any and all combinations of friction-reduced hydraulic fracturing slurry 90, additional water, one or more additives 168, and other fluids may be conveyed from the centralized facility 66 to the one or more fracturing sites 52 through the various volumes 188, 190 of the pipeline 74B illustrated in FIG. 18. Although illustrated in FIG. 18 as including two internal pipes 186A, 186B, in other embodiments, the pipeline 74B may include any number (e.g., two, three, four, five, or even more) of internal pipes 186.

In certain embodiments, the various volumes 188, 190 of the pipelines 74A, 74B illustrated in FIGS. 17 and 18 may be used to facilitate multi-directional flow of fluids through the volumes 188, 190. For example, although in certain embodiments, certain fluids may flow in a unidirectional manner from the centralized facility 66 to one or more fracturing sites 52 within respective volumes 188, 190 of the pipelines 74A, 74B, in other embodiments, a first fluid may flow from the centralized facility 66 to one or more fracturing sites 52 through one of the volumes 188, 190 while a second fluid may flow in the opposite direction from the one or more fracturing sites 52 to the centralized facility 66 in another of the volumes 188, 190. As but one non-limiting example, in an embodiment where a fracturing site 52 is also a production well site 10, produced water 88 from the fracturing site 52 may be conveyed to the centralized facility 66 through one of the volumes 188, 190 of a pipeline 74A, 74B whereas fracturing slurry 90 may be conveyed from the centralized facility 66 to the fracturing site 52 via another of the volumes 188, 190 of the pipeline 74A, 74B.

Returning now to FIGS. 6, 13, and 16, as described in greater detail herein, the one or more process control systems 94 may be configured to control any and all operating parameters of the centralized facility 66 and/or the one or more well sites 10 and/or the one or more fracturing sites 52. For example, in certain embodiments, the one or more process control systems 94 may be configured to control flow rates of the plurality of fluids conveyed by the pipelines 74 illustrated in FIGS. 17 and 18 such that blending ratios between the fluids conveyed therein are adjusted to achieve a desired end state or final concentration at the one or more fracturing sites 52 to achieve optimal friction reduction for the particular operating conditions of the one or more fracturing wells 48 at the one or more fracturing sites 52 (e.g., determined by the one or more process control systems 94 based on real-time measurements collected by sensors at the centralized facility 66 and/or the one or more fracturing sites 52 and/or the one or more well sites 10). For example, in certain embodiments, the one or more process control systems 94 may be configured to manipulate valves associated with the respective volumes 188, 190 of the pipelines 74 to achieve appropriate blending ratios between the fluids conveyed by the volumes 188, 190 in order to produce a final friction-reduced hydraulic fracturing slurry 90 based on the particular operating conditions of the one or more fracturing wells 48 at the one or more fracturing sites 52.

Similarly, in certain embodiments, the one or more process control systems 94 may be configured to select a particular friction-reducing additive 142 (e.g., from a plurality of friction-reducing additives 142) for addition to the water at the low-shear addition system 140 at the centralized facility 66 in order to produce a friction-reduced hydraulic fracturing slurry 90 based on the particular operating conditions of the one or more fracturing wells 48 at the one or more fracturing sites 52. For example, in certain embodiments, the one or more process control systems 94 may analyze the compositions of the fluid 144 to which the friction-reduced additive 142 is to be added and, based on the particular operating conditions of the one or more fracturing wells 48 at the one or more fracturing sites 52, may determine that a particular friction-reducing additive 142 (e.g., from a plurality of friction-reducing additives 142) and/or a particular concentration of the friction-reducing additive 142 may be ideal to convert the fluid 144 into a friction-reduced hydraulic fracturing slurry 90 that will meet the particular operating conditions of the one or more fracturing wells 48 at the one or more fracturing sites 52. Furthermore, in certain embodiments, the selection of the particular friction-reducing additive 142 (e.g., from a plurality of friction-reducing additives 142) and/or a particular concentration of the friction-reducing additive 142 may be determined by the one or more process control systems 94 based at least in part on performance parameters of the one or more wells 22 at the one or more well sites 10, for example, which may be derived by the one or more process control systems 94 from archived performance measurements of the one or more wells 22 (e.g., archived in the cloud storage 180).

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method, comprising:
   receiving water at a centralized facility;
   receiving sand from one or more sand mines at the centralized facility;
   receiving one or more chemicals at the centralized facility;
   using processing equipment of the centralized facility to process the water, the sand, and the one or more chemicals to produce a fracturing slurry, wherein using the processing equipment comprises:
      using a low-shear addition system to add a friction-reducing additive to the fracturing slurry, wherein using the low-shear addition system comprises using at least one eductor to disperse the friction-reducing additive into the fracturing slurry; and
   conveying the fracturing slurry from the centralized facility to one or more fracturing sites.

2. The method of claim 1, comprising conveying the fracturing slurry from the centralized facility to the one or more fracturing sites using one or more fracturing slurry pipelines.

3. The method of claim 2, wherein the one or more fracturing slurry pipelines comprise one or more transfer hoses, one or more temporary lay-flat hoses, one or more polymeric pipes, or some combination thereof.

4. The method of claim 2, comprising boosting a pressure of the fracturing slurry at one or more intermediate locations along the one or more fracturing slurry pipelines.

5. The method of claim 1, comprising using a process control system to automatically adjust one or more properties of the fracturing slurry based at least in part on one or more operating parameters relating to the water, the sand, or the one or more chemicals, or a combination thereof.

6. The method of claim 1, wherein the one or more sand mines comprise one or more mobile sand mines.

7. The method of claim 1, comprising:
   conveying the water from the centralized facility to the one or more sand mines; and
   using the water in mining operations at the one or more sand mines.

8. The method of claim 1, comprising passively mixing the water, the sand, and the one or more chemicals without using active mixing equipment.

9. A method, comprising:
   receiving water at a centralized facility via one or more water pipelines;
   receiving sand from one or more sand mines at the centralized facility via one or more sand pipelines;
   receiving one or more chemicals at the centralized facility;
   using processing equipment of the centralized facility to process the water, the sand, and the one or more chemicals to produce a fracturing slurry, wherein using the processing equipment comprises:
      using a dilution manifold to dilute concentrations of the sand, the one or more chemicals, or both, in the fracturing slurry;
      using dewatering equipment to remove water from the fracturing slurry;
      using blending equipment to add water into the fracturing slurry; or
      using a low-shear addition system to add a friction-reducing additive to the fracturing slurry; or
      a combination thereof; and
   conveying the fracturing slurry from the centralized facility to one or more fracturing sites via one or more fracturing slurry pipelines, wherein the one or more fracturing slurry pipelines comprise a textured, interior surface that facilitates passive mixing of the fracturing slurry.

10. The method of claim 9, comprising boosting a pressure of the fracturing slurry at one or more intermediate locations along the one or more fracturing slurry pipelines.

11. The method of claim 9, comprising passively mixing the water, the sand, and the one or more chemicals without using active mixing equipment.

12. The method of claim 9, comprising using a process control system to automatically adjust one or more properties of the fracturing slurry based at least in part on one or more operating parameters relating to the water, the sand, or the one or more chemicals, or a combination thereof.

13. The method of claim 9, comprising:
   conveying the water from the centralized facility to the one or more sand mines; and
   using the water in mining operations at the one or more sand mines.

14. The method of claim 9, wherein the water is produced water from one or more well sites.

15. The method of claim 9, wherein the one or more fracturing slurry pipelines comprise one or more transfer hoses, one or more temporary lay-flat hoses, one or more polymeric pipes, or some combination thereof.

16. A method, comprising:
   receiving produced water from one or more well sites at a centralized facility via one or produced water pipelines;
   receiving sand from one or more sand mines at the centralized facility via one or more sand pipelines;
   receiving one or more chemicals at the centralized facility; and
   conveying the produced water, the sand, and the chemicals from the centralized facility to one or more fracturing sites via one or more fracturing slurry pipelines and processing equipment of the centralized facility, wherein:
      movement of the produced water, the sand, and the one or more chemicals through the one or more fracturing slurry pipelines and the processing equipment passively mixes the produced water, the sand, and the one or more chemicals into a fracturing slurry without using active mixing equipment; and the processing equipment comprises:

a low-shear addition system to add a friction-reducing additive to the fracturing slurry, wherein the low-shear addition system comprises at least one eductor to disperse the friction-reducing additive into the fracturing slurry.

17. The method of claim 16, comprising boosting a pressure of the fracturing slurry at one or more intermediate locations along the one or more fracturing slurry pipelines.

18. The method of claim 16, comprising using a process control system to automatically adjust one or more properties of the fracturing slurry based at least in part on one or more operating parameters relating to the produced water, the sand, or the one or more chemicals, or a combination thereof.

19. The method of claim 16, comprising:

conveying the produced water from the centralized facility to the one or more sand mines; and using the produced water in mining operations at the one or more sand mines.

20. The method of claim 16, wherein the one or more fracturing slurry pipelines comprise one or more transfer hoses, one or more temporary lay-flat hoses, one or more polymeric pipes, or some combination thereof.

* * * * *